(12) United States Patent
Imazaki et al.

(10) Patent No.: US 8,892,847 B2
(45) Date of Patent: Nov. 18, 2014

(54) VOLUME MANAGEMENT AND PAGE ALLOCATION METHOD

(75) Inventors: Miho Imazaki, Yokohama (JP); Yusuke Nonaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 436 days.

(21) Appl. No.: 13/124,556

(22) PCT Filed: Apr. 5, 2011

(86) PCT No.: PCT/JP2011/002016
§ 371 (c)(1),
(2), (4) Date: Apr. 15, 2011

(87) PCT Pub. No.: WO2012/137249
PCT Pub. Date: Oct. 11, 2012

(65) Prior Publication Data
US 2012/0260038 A1 Oct. 11, 2012

(51) Int. Cl.
*G06F 12/00* (2006.01)
(52) U.S. Cl.
USPC ............. 711/209; 711/114; 711/E12.002; 711/E12.059
(58) Field of Classification Search
None
See application file for complete search history.

(56) References Cited

U.S. PATENT DOCUMENTS

| | | | |
|---|---|---|---|
| 7,613,945 B2* | 11/2009 | Soran et al. | 714/5.11 |
| 7,631,155 B1* | 12/2009 | Bono et al. | 711/156 |
| 2002/0112113 A1* | 8/2002 | Karpoff et al. | 711/4 |
| 2004/0030727 A1 | 2/2004 | Armangau et al. | |
| 2007/0136548 A1* | 6/2007 | Mane | 711/170 |
| 2010/0153617 A1* | 6/2010 | Miroshnichenko et al. | 711/6 |
| 2012/0011329 A1* | 1/2012 | Nonaka | 711/154 |

FOREIGN PATENT DOCUMENTS

| | | |
|---|---|---|
| WO | WO 2005/017737 A2 | 2/2005 |
| WO | WO 2010/106574 A1 | 9/2010 |

OTHER PUBLICATIONS

PCT International Search Report and Written Opinion on application No. PCT/JP2011/002016 mailed Sep. 7, 2011; 10 pages.

* cited by examiner

*Primary Examiner* — Christian P Chace
*Assistant Examiner* — Brendan Lillis
(74) *Attorney, Agent, or Firm* — Foley & Lardner LLP

(57) ABSTRACT

The storage apparatus comprises a storage unit storing data read/written by the host apparatus, and a control unit controlling writing of the data to the storage unit. The control unit configures one or more pools from the storage unit and divides one of the pools into first pages having an area of a first size and divides the first pages into second pages having the second area, and manages the pages, manages a data storage area of a first volume storing the data by using the first-size area and manages a data storage area of a second volume storing the data by using the second-size area, assigns the first page to the data storage area of the first volume, and assigns the first page in units of the second volume and assigns the second page obtained by dividing the first page to the data storage area of the second volume.

18 Claims, 28 Drawing Sheets

FIG.5

| LARGE-SIZE PAGE ID | PAGE ATTRIBUTE | POINTER ID |
|---|---|---|
| 0 | 1 | 0 |
| 1 | 2 | NULL |
| 2 | 1 | 1 |
| 3 | 2 | NULL |
| 4 | 0 | NULL |
| 5 | 0 | NULL |

| LOGICAL PAGE ID | LARGE-SIZE PAGE ID | SMALL-SIZE PAGE ID | SHARED NUMBER COUNTER |
|---|---|---|---|
| 0000 | 1 | 0 | 4 |
| 0001 | 1 | 1 | 1 |
| 0002 | 2 | 6 | 2 |
| 0003 | 2 | 7 | 3 |
| 0004 | 2 | 9 | 50 |
| 0005 | 2 | 11 | 9 |
| 0006 | P | P | NULL |
| 0007 | P | P | NULL |
| 0008 | P | P | NULL |
| 0009 | P | P | NULL |

LUN0 :

| HOST PAGE NO | LOGICAL PAGE ID |
|---|---|
| 0 | 0000 |
| 1 | 0001 |
| 2 | 0006 |
| 3 | 0007 |
| 4 | 0008 |
| 5 | 0009 |

| LUN1 : | |
|---|---|
| HOST PAGE NO | LARGE-SIZE PAGE ID |
| 0 | 1 |
| 1 | 3 |

PRIMARY VOLUME 0

SAVE AREA BITMAP

HOST PAGE NO

| 0 | 1 | 2 | 3 | 4 | 5 | |
|---|---|---|---|---|---|---|
| 1 | 1 | 0 | 0 | 0 | 0 | ... |

2681

PRIMARY VOLUME MANAGEMENT TABLE

| CREATION TIME | DELETION TIME | CLONE VOLUME LUN |
|---|---|---|
| 2011/1/1 10:00 | 2011/1/8 10:00 | 0 |
| 2011/1/2 10:00 | 2011/1/9 10:00 | 1 |
| 2011/1/3 10:00 | 2011/1/10 10:00 | 2 |
| 2011/1/4 10:00 | 2011/2/4 10:00 | 3 |
| 2011/1/5 10:00 | 2011/1/12 10:00 | 4 |
| 2011/1/6 10:00 | 2011/1/13 10:00 | 5 |
| 2011/1/7 10:00 | 2011/1/14 10:00 | 6 |

| LUN | LARGE-SIZE PAGE ID |
|---|---|
| 0 | 0 |
| 1 | 1 |
| 2 | 2 |

| HLUN | SIZE [GB] | CLONE VOLUME DETER- MINATION | PRIMARY VOLUME DETER- MINATION | PRIMARY VOLUME LUN |
|---|---|---|---|---|
| 0 | 100 | 1 | 0 | 1 |
| 1 | 100 | 0 | 1 | NULL |
| 2 | 50 | 0 | 0 | NULL |
| 3 | 350 | 1 | 0 | 4 |
| 4 | 350 | 0 | 1 | NULL |

2631　2632　2633　2634　2635

263

FIG. 16
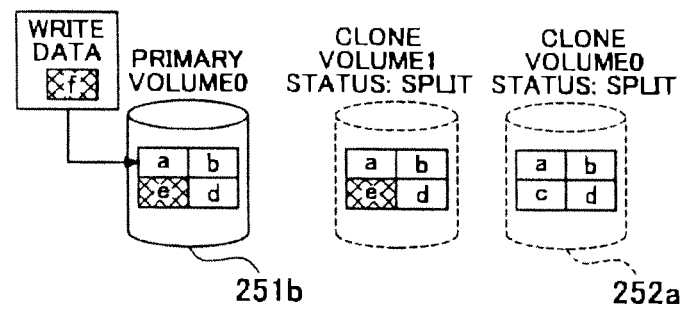
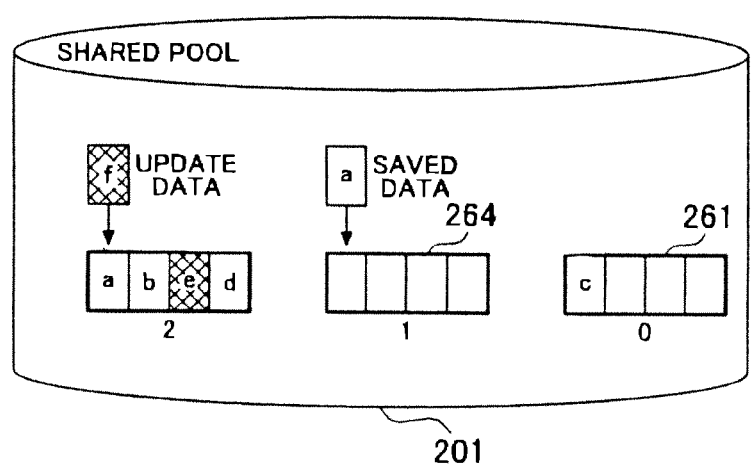

FIG. 17
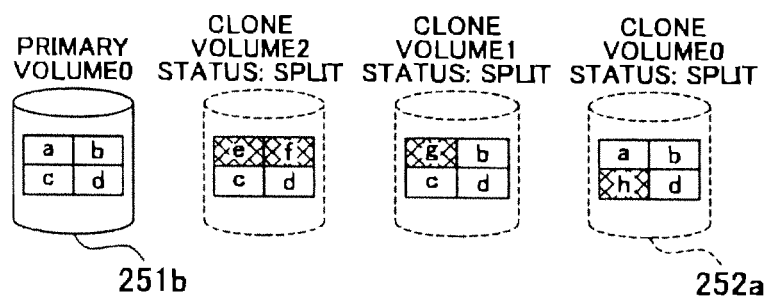
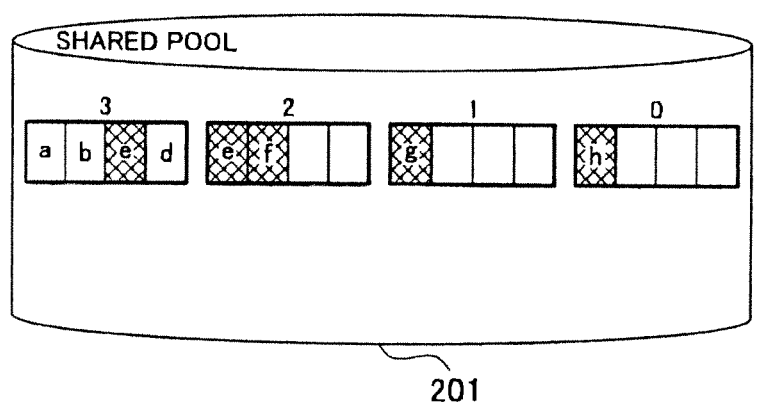

FIG. 26
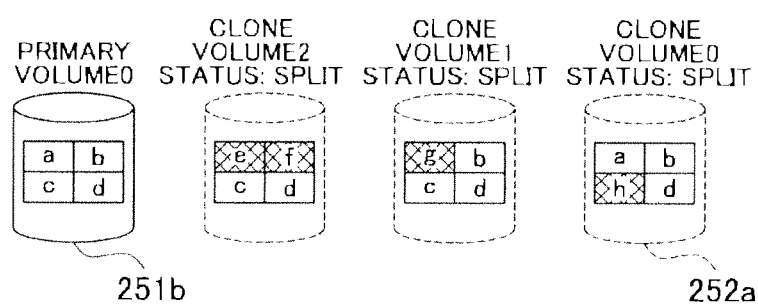
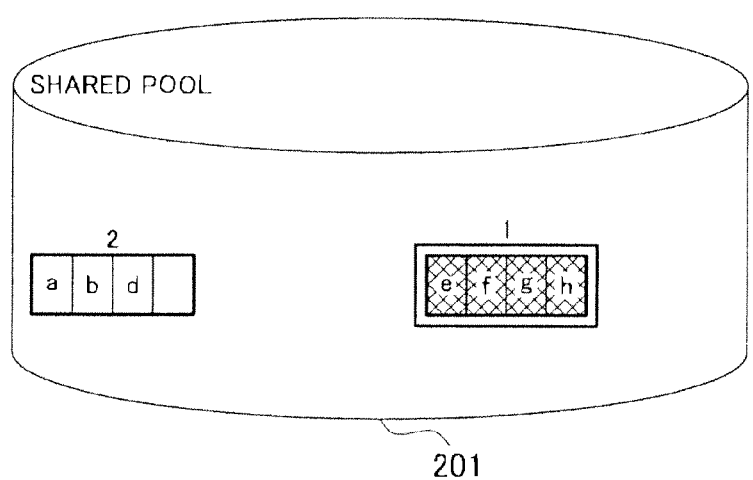

VOLUME MANAGEMENT AND PAGE ALLOCATION METHOD

TECHNICAL FIELD

The present invention relates to a storage apparatus and a volume management method and is suitably applied to a storage apparatus and volume management method which manage data by using a Thin Provisioning function and a snapshot function.

BACKGROUND

In a storage apparatus, the Thin Provisioning function and snapshot function are sometimes managed using different page sizes in order to exploit the respective features of these functions.

The foregoing Thin Provisioning function is a function which provides a virtual volume to a host apparatus and which, if write access to the virtual volume is made by the host apparatus, assigns a physical storage area for actually storing data to the virtual volume. Here, the physical storage area, which stores data, is a storage area which is provided by one or more HDD (hard disk drives) and one or more logical volumes are defined in the storage area. Furthermore, a single pool is configured from one or more logical volumes and one or more virtual volumes are associated with each of the pools. Further, if write access to a virtual volume is made by the host apparatus, storage area is assigned, in units of a predetermined size (hereinafter storage areas of this size are called 'pages'), to relevant segments of the write-accessed virtual volume from any of the logical volumes in the storage pool associated with this virtual volume.

When data writing is performed using a Thin Provisioning function of this kind, a large-page size storage area is preferably assigned for emphasis on sequential performance. PTL1, for example, discloses a technology for assigning the actual storage area in a RAID (Redundant Arrays of Independent Disks) group to a virtual volume in chunk units comprising a plurality of pages of equal size.

Meanwhile, the snapshot function is a function which holds images of a certain logical volume at a certain point in time (for example, at the time a snapshot acquisition request is received from the host apparatus). In a storage system, by executing the snapshot function at regular intervals, replication (backups) of data in the logical volume can be acquired intermittently. Furthermore, in the case of the snapshot function, normally, when data replication is acquired, a copy of the whole logical volume is not executed and, when write access is made to the logical volume, write processing is performed after pre-write access data has been saved in the pool. When differential data is stored using this snapshot function, a small-page size storage area is preferably assigned in view of capacity efficiency.

Therefore, in order to assign pages of suitable sizes for each of these functions, the creation of independent pools has been considered. However, if independent pools are created, it takes time and costs money to perform the pool capacity design and management work, which is a considerable burden on the user, and hence there is a need to be able to manage storage areas of different page sizes which are used by the Thin Provisioning function and snapshot function in a single pool. There is also a need for unused pages in the same pool to be loaned between the Thin Provisioning function and snapshot function.

CITATION LIST

Patent Literature

PTL 1: International Published Unexamined Patent Application No. 2010/106574

DISCOVERY OF THE PROBLEM

Storing pages of different sizes sequentially in a single pool has therefore been considered. However, there is a problem in that, if data that has been saved in the pool by the snapshot function is deleted, unless the small-page size storage area that is then released can be used by a Thin Provisioning function which manages the storage area as is using a large-page size, fragmentation will occur in the pool. Consideration has also been given to reserving a pool which is managed using a small-page size in advance for the snapshot function and also using this pool for the Thin Provisioning function. However, in this case, there is a problem in that the management units are then small, and therefore a huge amount of management information must be held, which may be a burden on memory capacity and may place constraints on the pool capacity.

The present invention was devised in view of the above and proposes a storage apparatus and volume management method which enable pages of different management sizes to be efficiently stored in the same pool.

SUMMARY OF INVENTION

In order to achieve the foregoing object, the present invention provides a storage apparatus which is connected via a network to a host apparatus which requests data writing. The storage apparatus comprises a storage unit which stores data that is read/written by the host apparatus; and a control unit which controls writing of the data to the storage unit, wherein the control unit configures one or two or more pools from the storage unit and divides one of the pools into first pages having an area of a first size and divides the first pages into second pages having the second area, and manages the pages, manages a data storage area of a first volume storing the data by using the first-size area and manages a data storage area of a second volume storing the data by using the second-size area, assigns the first pages to the data storage area of the first volume, and assigns the first pages in units of the second volume and assigns the second pages obtained by dividing the first pages to the data storage area of the second volume.

With this configuration, the shared pool of the storage apparatus is divided into first pages and the first pages are divided into second pages and these pages are managed, and a first volume is managed using a first-size area and a second volume is managed using a second-size area. Furthermore, the first pages are assigned to a data storage area of the first volume, the first pages are assigned in units of the second volume, and the second pages obtained by dividing the first pages are assigned to the data storage area of the second volume. Accordingly, storage areas of different data sizes can be managed in a single pool and unused capacity can be used efficiently within the same pool. Furthermore, since a large-size page is assigned to each of the deletion-target volumes, it is possible to prevent fragmentation in the pool when volumes are deleted.

ADVANTAGEOUS EFFECTS OF INVENTION

With the present invention, in a storage system in which different functions are used jointly, pages of different management sizes can be efficiently stored in the same pool, enabling straightforward management of pool capacity.

BRIEF DESCRIPTION OF DRAWINGS

FIG. 5 is a diagram showing an example of a shared pool management table according to this embodiment.

FIG. 7 is a diagram showing an example of a logical page management table according to this embodiment.

FIG. 8 is a diagram showing an example of a clone-volume volume management table according to this embodiment.

FIG. 9 is a diagram showing an example of a Thin Provisioning-volume volume management table according to this embodiment.

FIG. 10 is a diagram showing an example of primary volume management information according to this embodiment.

FIG. 11 is a diagram showing an example of a large-size page assignment management table according to this embodiment.

FIG. 12 is a diagram showing an example of a LUN management table according to this embodiment.

FIG. 16 is a conceptual view illustrating a data storage method using a snapshot function according to this embodiment.

FIG. 17 is a conceptual view illustrating a data storage method using a snapshot function according to this embodiment.

FIG. 26 is a conceptual view providing an overview of a second embodiment.

DETAILED DESCRIPTION OF EMBODIMENTS OF THE INVENTION

Figure 1:
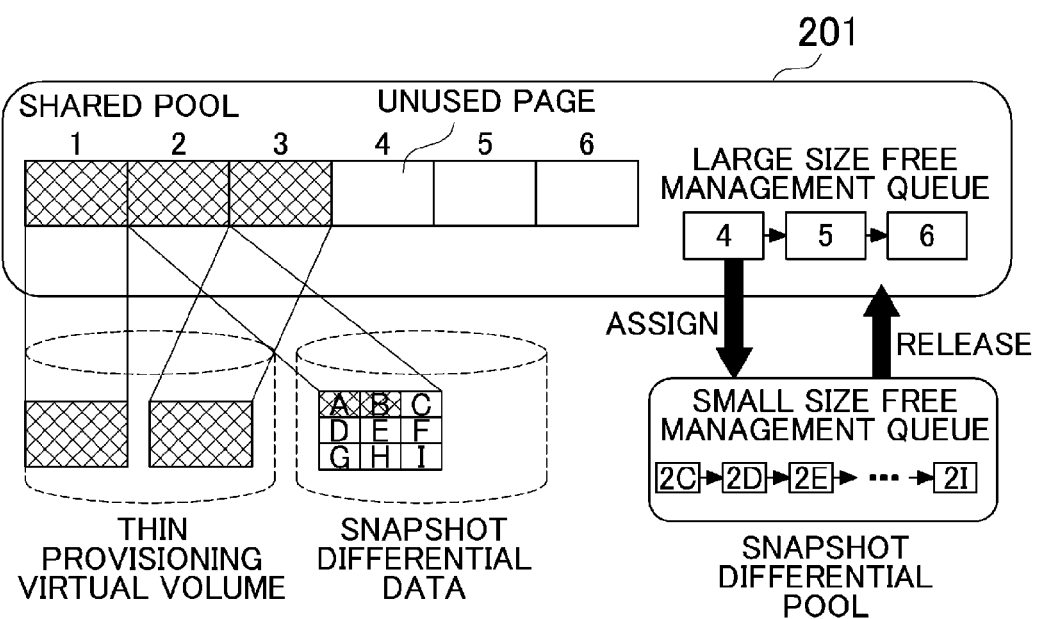
FIG. 1 is a conceptual view providing an overview according to a first embodiment of the present invention.

An embodiment of the present invention will be described in detail hereinbelow with reference to the drawings.

(1) First Embodiment (1-1) Overview of this Embodiment

First, an overview of this embodiment will be provided. Hereinafter, a storage system which uses a Thin Provisioning function and a snapshot function will be described. In a storage system which uses a Thin Provisioning function and a snapshot function, the Thin Provisioning function and snapshot function are sometimes managed using different page sizes in order to exploit the respective features of these functions.

The foregoing Thin Provisioning function is a function which provides a virtual volume to a host apparatus and which, if write access to the virtual volume is made by the host apparatus, assigns a physical storage area for actually storing data to the virtual volume. Here, the physical storage area, which stores data, is a storage area which is provided by one or more HDD (hard disk drives) and one or more logical volumes are defined in the storage area. Furthermore, a single pool is configured from one or more logical volumes and one or more virtual volumes are associated with each of the pools. In addition, if write access to the virtual volumes is made by the host apparatus, storage area is assigned, in units of a predetermined size (hereinafter storage areas of this size are called 'pages'), to corresponding segments of the write-accessed virtual volume from any of the logical volumes in the storage pool associated with this virtual volume. When data writing is performed using a Thin Provisioning function of this kind, a large-page size storage area is preferably assigned for emphasis on sequential performance.

Meanwhile, the snapshot function is a function which holds images of a certain logical volume at a certain point in time (for example, at the time a snapshot acquisition request is received from the host apparatus). In a storage system, by executing the snapshot function at regular intervals, replication (backups) of data in the logical volume can be acquired intermittently. Furthermore, in the case of the snapshot function, normally, when data replication is acquired, a copy of the whole logical volume is not executed and, when write access is made to the logical volume, write processing is performed after pre-write access data has been saved in the pool. When differential data is stored using this snapshot function, a small-page size storage area is preferably assigned in view of capacity efficiency.

Therefore, in order to assign pages of suitable sizes for each of these functions, the creation of independent pools has been considered. However, if independent pools are created, it takes time and costs money to perform the pool capacity design and management work, which is a considerable burden on the user, and hence there is a need to be able to manage storage areas of different page sizes which are used by the Thin Provisioning function and snapshot function in a single pool. Moreover, there is also a need for unused pages in the same pool to be loaned between the Thin Provisioning function and snapshot function.

Storing pages of different sizes sequentially in a single pool has therefore been considered. However, there is a problem in that, if data that has been saved in the pool by the snapshot function is deleted, unless the small-page size storage area that is then released can be used by the Thin Provisioning function which manages the storage area as is using a large-page size, fragmentation will occur in the pool. Consideration has also been given to reserving a pool which is managed using a small-page size in advance for the snapshot function and also using this pool for the Thin Provisioning function. However, in this case, there is a problem in that the management units are then small, and therefore a huge amount of management information must be held, which may be a burden on memory capacity and may place constraints on the pool capacity.

Hence, according to this embodiment, pool management is hierarchized by dividing the interior of a single pool into large sized pages (which may be referred to as 'large-size pages' hereinbelow) and dividing the large-size pages into small sized pages (which may also be called 'small-size pages' hereinbelow). More specifically, according to this embodiment, as shown in FIG. 1, data is stored in a single shared pool 201 by both the Thin Provisioning function and the snapshot function. Large-size pages are managed in the shared pool 201 and if the page sizes managed by each of the functions are smaller than the large-size pages, the large-size pages used by each function are divided and managed as small-size pages. For example, with the Thin Provisioning function, large-size pages are assigned to each volume and data is stored in the large-size pages. Meanwhile, with the snapshot function, large-size pages are assigned to each volume and differential data is stored in small-size pages obtained by dividing the large-size pages.

Furthermore, a queue for managing unused pages among the large-size pages in the shared pool 201 and a queue for managing unused pages among the small-size pages are respectively provided and management is performed to assign the small-size pages to any of the pages among the large-size pages. More specifically, where the small-size pages used by the snapshot function are concerned, when there are no more unused pages among the small-size pages, an unused page among the large-size pages is reserved. The reserved large-size page is then divided into small-size pages and thus managed as unused small-size pages. As for the release of small-size pages, if all the small-size pages of a divided large-size page are free, the large-size page is released and returned to the shared pool 201.

Accordingly, with this embodiment, metadata for managing large-size pages in the shared pool 201 is preferably generated, if necessary together with metadata for small-size page management, and therefore deleting pool management information enables efficient usage of memory capacity.

Figure 2:
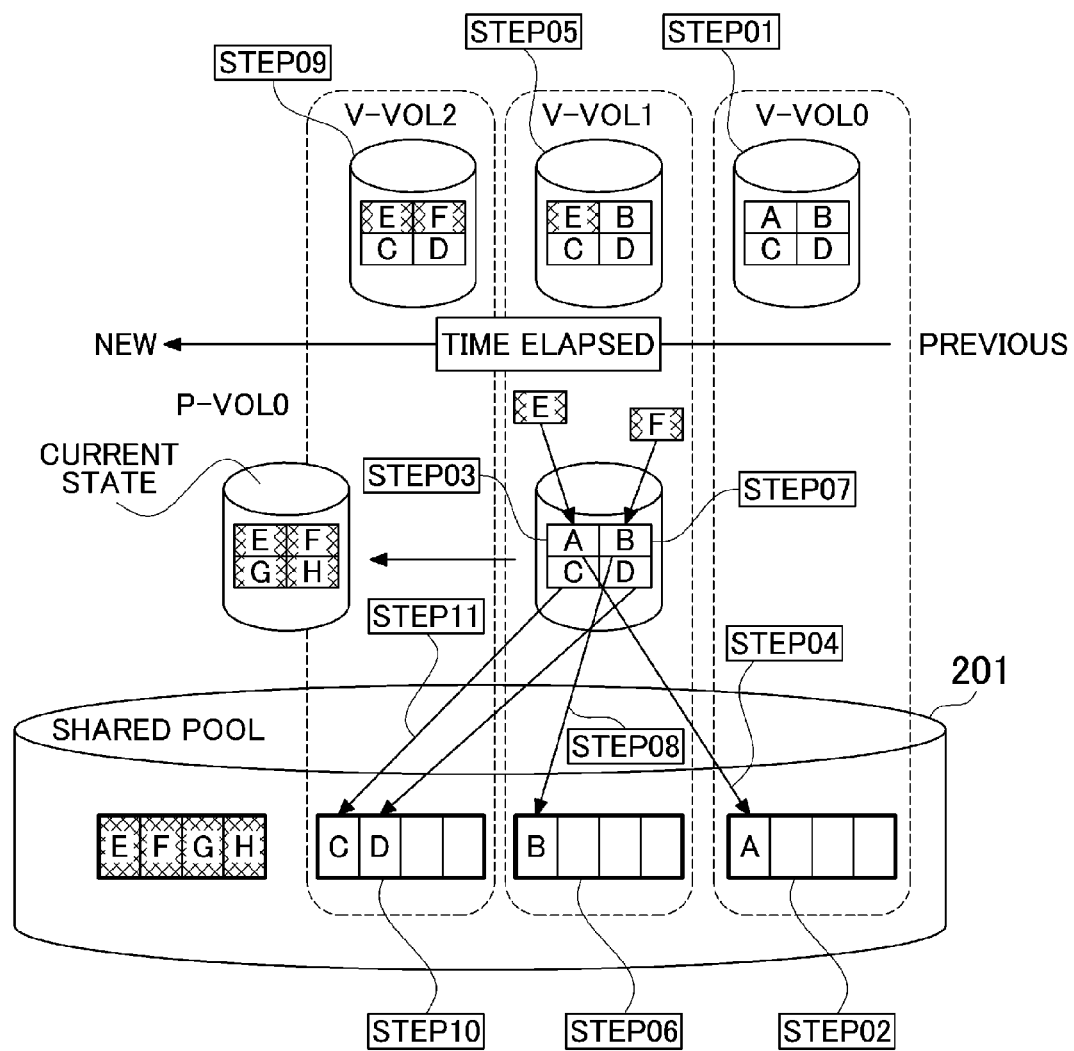
FIG. 2 is a conceptual view providing an overview of this embodiment.

Furthermore, when large-size pages which are divided into small-size pages are assigned by the snapshot function, data fragmentation within the pool is prevented by assigning large-size pages for each deletion unit. More specifically, as shown in FIG. 2, a snapshot volume (V-VOL0) is first generated in response to a snapshot acquisition request from the host apparatus or the like (STEP01). When the V-VOL0 is generated in STEP01, a large-size page which is associated with this volume is reserved and the large-size page is divided into small-size pages (STEP02).

If there is subsequently a request to write data 'E' to an area where data 'A' is stored (STEP03), former data 'A' is saved to the large-size page reserved in STEP02 (STEP04). A snapshot volume (V-VOL1) to which data 'E' is written in place of data 'A' which was saved in STEP04 is then generated (STEP05). When V-VOL1 is generated in STEP05, the large-size page assigned to this volume is reserved and the large-size page is divided into small-size pages (STEP06).

In addition, when there is a request to write data 'F' to an area where data 'B' is stored (STEP07), former data 'B' is saved to the large-size page reserved in STEP06 (STEP08). A snapshot volume (V-VOL2) to which data 'F' is written in place of data 'B' which was saved in STEP07 is then generated (STEP09). When V-VOL2 is generated in STEP09, the large-size page assigned to this volume is reserved and the large-size page is divided into small-size pages (STEP10).

Furthermore, when there is a request to write data 'G' and 'H' to the areas where data 'C' and 'D' are stored, the former data 'C' and 'D' are saved to the large-size page reserved in STEP10 (STEP11).

Accordingly, with the snapshot function, which manages the pool area in small-size pages, a large-size page which has been divided into small-size pages is assigned to each snapshot volume and the data which can be deleted is simultaneously stored in the same large-size page. Accordingly, if the snapshot volume is deleted, the small-size pages storing the data of this volume are deleted and the data of the divided large-size page is all deleted, thus enabling the large-size page to be released. The released large-size page is added to the queue which manages unused pages among the large-size pages and can also be used by the Thin Provisioning function which performs management using large-size pages. In this way, capacity can be loaned between the functions using different page sizes while preventing fragmentation of data within the pool and pages of different management sizes can be efficiently stored in the same pool.

(1-2) Computer System Hardware Configuration

Figure 3:
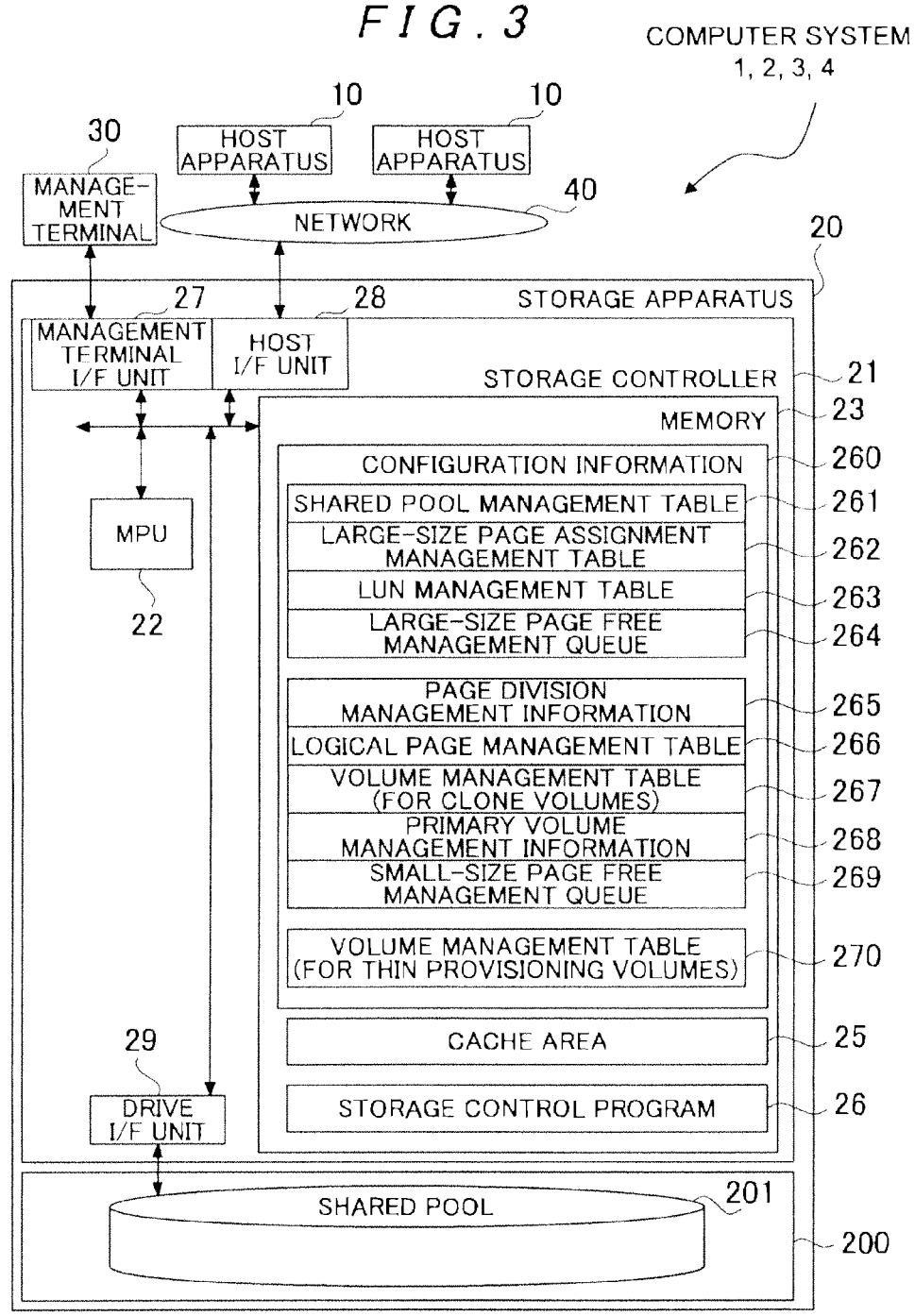
FIG. 3 is a block diagram showing a hardware configuration of a computer system according to this embodiment.

The hardware configuration of the computer system 1 will be explained next. As shown in FIG. 3, a computer system 1 is configured from a host apparatus 10, a storage apparatus 20, a management terminal 30, and a network 40.

The computer system 1 is configured from a personal computer, a workstation, and a mainframe and the like, for example, which is a computer device comprising information processing resources such as a CPU (Central Processing Unit) and memory. The CPU functions as an arithmetic processing unit and controls the operation of the host apparatus 10 according to the programs and computational parameters stored in the memory. Furthermore, the host apparatus 10 comprises information input devices such as a keyboard, switch, pointing device and microphone, and information output devices such as a monitor display and speakers.

Furthermore, the host apparatus 10 is connected to the storage apparatus 20 via the network 40. The network 40 is configured from a SAN (Storage Area Network), for example, and inter-device communications are executed according to the Fibre Channel Protocol, for example. In addition, the network 40 may be a LAN (Local Area Network), the Internet, a public line, or a dedicated line, or the like, for example. If the network 40 is a LAN, inter-device communications are executed according to the TCP/IP (Transmission Control Protocol/Internet Protocol) protocol, for example.

The host apparatus 10 transmits a data read/write request to the storage apparatus 20 which is connected via the network 40.

The storage apparatus 20 parses the read/write command transmitted from the host apparatus 10 connected via the network 40 and executes reading/writing from/to a storage medium in the storage apparatus 20. Furthermore, the storage apparatus 20 is configured from a storage controller 21 and a drive unit 200.

The storage controller 21 comprises an MPU (Micro Processing Unit) 22, a memory 23, a management terminal interface unit (abbreviated to 'management terminal I/F unit' in the drawings) 27, a host interface unit (abbreviated to 'host interface I/F' in the drawings) 28 and a drive interface unit ('drive I/F unit' in the drawings) 29.

The MPU 22 functions as an arithmetic processing unit and controls the whole storage apparatus 20 according to the programs and computation parameters and so on stored in the memory 23. The memory 23 is a storage area enabling high-speed access by the MPU 22 and stores configuration information 260, a cache area 25, and a storage control program 26 and so on. The configuration information 260 includes various parameters. The cache area 25 is a storage area which temporarily stores data in order to accelerate data reading/writing. The storage control program 26 is a program which is used by the MPU 22 and which controls data I/Os by using various parameters contained in the configuration information 260.

The management terminal interface unit 27 is an interface enabling a connection to the management terminal 30 via a management network. In addition, the host interface unit 28 is an interface enabling a connection to the host apparatus 10 via the network 40. Furthermore, the drive interface unit 29 is an interface for sending and receiving data to and from a storage device.

The drive interface unit 29 is configured from a plurality of storage media. The storage media are configured from a plurality of hard disk drives (HDD) or SSD (Solid State Drives) which comprise high-cost hard disk drives such as SCSI (Small Computer System Interface) disks or low-cost hard disk drives such as SATA (Serial AT Attachment) disks.

Furthermore, a group of one or more physical disks is formed from one or more storage media. An example of such a physical disk group is RAID. Furthermore, one or more logical volumes are defined in the storage area provided by a physical disk group. In addition, logical volumes which are provided by one or more groups are managed as a single pool. In this embodiment, a single pool is utilized by the Thin Provisioning function and the snapshot function, and hence this pool will be referred to in the following description as a 'shared pool 201.'

Figure 4:
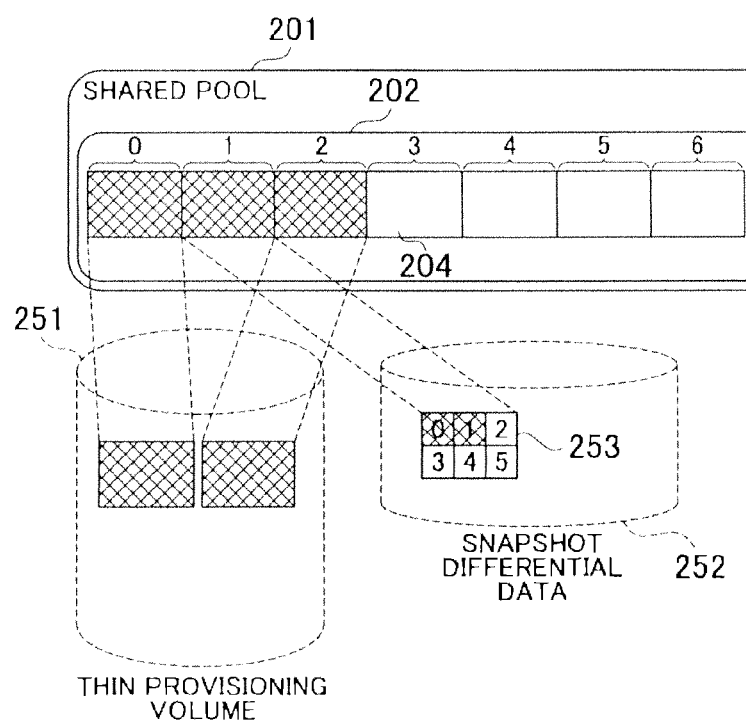
FIG. 4 is a conceptual view illustrating a method of managing different page sizes according to this embodiment.

Here, a method for managing different page sizes in the shared pool 201 will described. As shown in FIG. 4, the pages in the shared pool 201 are each managed by large-size pages 204 and large-size pages 204 are provided for each of the Thin Provisioning function and snapshot function. In the Thin Provisioning function, the page sizes of a Thin Provisioning volume 251 are managed using the same page size as the large-size pages 204.

Furthermore, in the case of the snapshot function, the page sizes of volumes 252 for storing snapshot differential data are managed using small-size pages which are obtained by dividing large-size pages. Specifically, when differential data is stored by the snapshot function, a large-size page 204 in the shared pool 201 is divided into small-size pages 253 and differential data is stored in the small-size pages. In addition, if a new area is required as a storage location for the snapshot differential data, a large-size page 204 is provided from the shared pool 201. The area for storing snapshot differential data therefore changes dynamically.

(1-3) Software Configuration of the Storage Area

The software configuration of the storage apparatus 20 will be described next. The software configuration is described in detail hereinbelow in particular for various parameters which are contained in the configuration information 260 which is used by storage control program 26.

As shown in FIG. 3, the configuration information 260 contains a shared pool management table 261, a large-size page assignment management table 262, a LUN (Logical Unit Number) management table 263, a large-size page free management queue 264, which manage the configuration of the shared pool 201; page division management information 265, a logical page management table 266, a volume management table (clone volume) 267, primary volume management information 268 and a small-size page free management queue 269, which manage volumes used by the snapshot function; and a volume management table (Thin Provisioning function) 270 which manages volumes used by the Thin Provisioning function.

The shared pool management table 261 is a table which manages the configuration of the shared pool 201 in the drive unit 200 and, as shown in FIG. 5, is configured from a large-size page ID field 2610, a page attribute field 2611, and a pointer ID field 2612. The shared pool management table 261 is created in association with one shared pool.

The large-size page ID field 2610 stores information which identifies large-size pages configured in the shared pool 201. The page attribute field 2611 stores information showing the attributes of each of the large-size pages. For example, '0' is stored in the case of an unused area not used by a large-size page. Furthermore, '1' is stored if the large-size page area is assigned to a snapshot backup data volume (hereinafter these volumes are called 'clone volumes'). In addition, '2' is stored if the large-size pages are assigned to the Thin Provisioning volume.

The pointer ID field 2612 stores a pointer ID which shows the storage location of page division management information 265, described subsequently. The pointer ID field 2612 stores a pointer ID which shows the storage location of the page division management information 265 which manages small-size pages obtained by dividing a large-size page if the page attribute of the large-size page is '1', that is, if the large-size page is a clone volume page.

Figure 6:
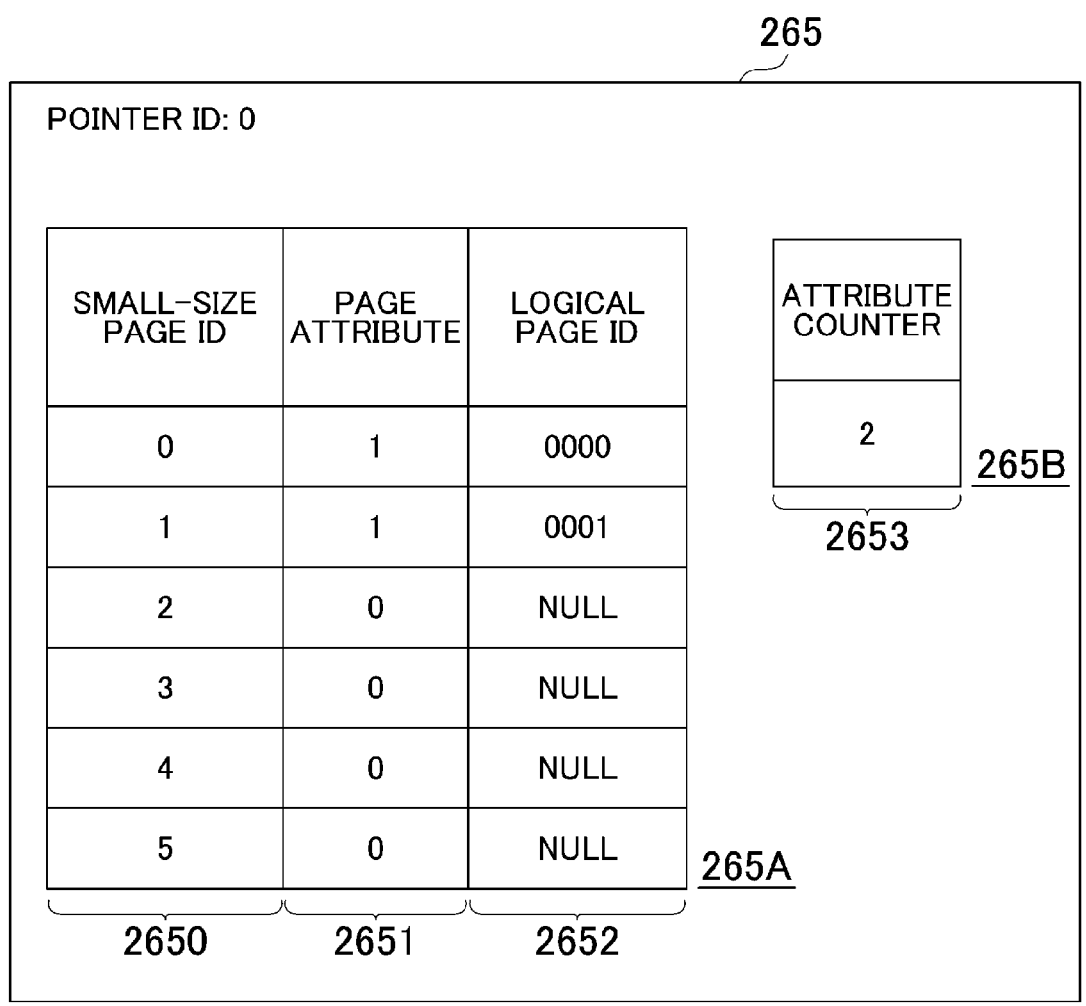
FIG. 6 is a diagram showing an example of division management information according to this embodiment.

The page division management information 265 is described next. The page division management information 265 is management information which is used by the snapshot function and which manages small-size pages generated by dividing large-size pages and, as shown in FIG. 6, is configured from a page division management table 265A which manages each small-size page and an attribute counter table 265B which manages small-size page attributes. Furthermore, the page division management information 265 is generated for each large-size page and, more specifically, generated for each pointer ID in the shared pool management table 261. For example, the page division management information 265 shown in FIG. 6 is associated with the pointer ID '0'.

The page division management table 265A is a table for managing the configuration of small-size pages and, as shown in FIG. 6, is configured from a small-size page ID field 2650, a page attribute field 2651 and a logical page ID field 2652. The small-size page ID field 2650 stores information, which identifies small-size pages obtained by dividing a large-size page, in one large-size page. For example, if data is not stored in one small-size page, the page attribute field 2651 stores '0', and if data is stored in one small-size page, the page attribute field 2651 stores '1'. The logical page ID field 2652 stores logical identification information which is assigned to a small-size page if data is stored in the small-size page. The logical page ID is identification information which is assigned to the small-size page in which data is stored according to a plurality of large-size pages divided into small-size pages.

Furthermore, the attribute counter table 265B is a table for managing the count value of the small-size page in which data is stored and, as shown in FIG. 6, is configured from an attribute counter field 2563. The attribute counter field 2563 stores the total number of small-size pages where data is stored and, more specifically, stores the total value of the values stored in the page attribute field 2651 of the page division management table 265A.

The logical page management table 266 is described next. The logical page management table 266 is a management table which is used by the snapshot function and which manages the storage location for clone volume data generated by the snapshot function. The logical page management table 266 is, as shown in FIG. 7, configured from a logical page ID field 2660, a large-size page ID field 2661, a small-size page ID field 2662 and a shared number counter field 2663.

The logical page ID field 2660 is associated with the logical page ID field 2652 of the page division management table 265A and stores logical identification information which is assigned to the small-size pages where data is stored. The large-size page ID field 2661 stores information identifying the large-size pages to which the pages indicated by the logical page IDs belong. The small-size page ID field 2662 stores information identifying small-size pages to which the data indicated by the logical page IDs belong. The shared number counter field 2663 stores information indicating the number of clone volumes sharing the pages indicated by the logical page IDs.

For example, if a number equal than or greater than 2 is stored in the shared number counter field 2663, this indicates that a plurality of clone volumes are sharing the page data. The information of the logical page ID 2660 is associated as the data storage location with each of the clone volumes. Thus, information of the small-size page ID field 2662 is not directly associated as the data storage location for each clone volume, rather, information of the logical page ID 2660 is associated [with each clone volume]. Accordingly, if the storage location of data which is shared by the plurality of volumes changes as a result of the data being saved and so on, since the information of the logical page ID 2652 may be rewritten without the need to rewrite the management information of the plurality of clone volumes, the data rewrite count can be reduced.

In addition, as shown in FIG. 7, if the logical page ID stored in the logical page ID 2660 indicates data of a primary volume which is the clone volume source, 'P', which indicates a primary volume, is stored in the large-size page ID field 2661 and a small-size page ID field 2662, and 'null' is stored in the shared number counter field 2663.

The clone-volume volume management table 267 will be described next. The volume management table 267 is a table for managing clone-volume configuration information generated by the snapshot function and, as shown in FIG. 8, is configured from a host page No. field 2670 and a logical page ID field 2671. Further, the volume management table 267 is generated for each clone volume. FIG. 8 shows a volume management table 267 for a clone volume having a logical volume number (LUN) '0'.

The host page No. field 2670 stores identification information for pages which store data managed by the host apparatus 10. The logical page ID field 2671 stores clone-volume logical page IDs. As a result, information indicating which page (host page) managed by the host apparatus 10 corresponds to a particular page in the clone volume can be managed.

The Thin Provisioning-volume volume management table 270 will be described next. The volume management table 270 is a table which manages Thin Provisioning volume configuration information generated by the Thin Provisioning function and, as shown in FIG. 9, is configured from the host page No. field 2700 and a large-size page ID field 2701. Furthermore, the volume management table 270 is generated for each Thin Provisioning volume. FIG. 9 shows the volume management table 270 of a Thin Provisioning volume with the logical volume number (LUN) '1'.

The host page No. field 2700 stores identification information of pages storing data managed by the host apparatus 10. The large-size page field 2701 stores the page IDs of the large-size pages assigned to the Thin Provisioning volume. As a result, information indicating which page (host page) managed by the host apparatus 10 corresponds to a particular page in the Thin Provisioning volume can be managed.

The primary volume management information 268 is explained next. The primary volume management information 268 is a table which manages configuration information for primary volumes serving as clone-volume sources and which is configured from a save area bitmap 2681 and a primary volume management table. Furthermore, the primary volume management information 268 is generated for each primary volume and the primary volume management information 268 shown in FIG. 10 is associated with the primary volume '0'.

As shown in FIG. 10, the save area bitmap 2681 contained in the primary volume management information 268 manages information indicating whether a 'Copy on Write' operation has already been generated by the snapshot function for the small-size pages of the primary volumes. In other words, a 'Copy on Write' operation is generated for the small-size pages of the primary volumes and management is performed to determine whether or not the source data is stored in the storage area 253 for the snapshot differential data shown in FIG. 4. More specifically, the save area bitmap 2681 stores, for each host page, '1' if the data of the page is saved in the snapshot differential data storage area 253 and stores '0' if data is not saved.

Here, a 'Copy on Write' operation of the snapshot function is an operation in which data shared prior to data write processing is saved if a clone volume shares the same data as the primary volume. More specifically, if new write processing occurs in the primary volume and the data shared with the clone volume is to be rewritten with other data, the clone-volume small-size page ID 2662 is saved to the snapshot differential data storage area 253. Furthermore, once the save operation has occurred for a certain small-size page ID 2662, the primary volume does not share data with the clone volume. Hence, a copy on write operation is not generated if data rewriting is carried out once the save operation has occurred.

Furthermore, the primary volume management table 2682 contained in the primary volume management information 268 is a table which manages information on clone volumes created using the snapshot function for the primary volume. As shown in FIG. 10, the primary volume management table 2682 is configured from a creation time field 2683, a deletion time field 2684, and a clone volume LUN field 2685.

The creation time field 2683 stores the dates and times clone volumes are created. The deletion time field 2684 stores a scheduled date and time for clone deletion. Further, the clone volume LUN field 2685 stores logical volume numbers (LUN) which is information identifying the clone volumes.

Where the foregoing clone volumes are concerned, the archiving period differs for each clone volume. For example, there exist clone volumes which are saved for a long period without being deleted after being archived for a fixed period as a primary volume backup volume. Furthermore, there are also clone volumes which are deleted after being archived for a fixed period as primary-volume backup volumes.

The large-size page assignment management table 262 will be described next. The large-size page assignment management table 262 is a table which manages information on large-size pages in the shared pool 201. The large-size page assignment management table 262 is, as shown in FIG. 11, configured from a LUN field 2620 and a large-size page ID field 2621. The LUN field 2620 stores information for logical numbers identifying volumes which are created in the shared pool 201 irrespective of the type of function, such as the snapshot function or Thin Provisioning function. Furthermore, the large-size page ID field 2621 stores information identifying the large-size pages which each volume possesses. Note that although a single volume may sometimes possess a plurality of large-size pages, the ID of the most recently assigned large-size page among the plurality of large-size pages that the volume possesses is stored in the large-size page ID field 2621.

The LUN management table 263 will be described next. The LUN management table 263 is a table for managing logical volumes which are using storage area in the shared pool 201 and, as shown in FIG. 12, is configured from an HLUN field 2631, a size field 2632, a clone-volume determination field 2633, a primary volume determination field 2634 and a primary volume LUN field 2635.

The HLUN field 2631 stores information on the numbers of the logical volumes managed by the host apparatus 10. The size field 2632 stores information on the sizes of each of the logical volumes. The clone volume determination field 2633 stores information determining whether each of the logical volumes is a clone volume. For example, this field stores '1' if a logical volume is a clone volume and stores '0' if the logical volume is not a clone volume. Furthermore, the primary volume determination field 2634 stores information determining whether or not each of the logical volumes is a primary volume. For example, this field stores '1' if the logical volume is a primary volume and stores '0' if the logical volume is not a primary volume. In addition, if a logical volume is neither a clone volume nor a primary volume, that is, in the case of a logical volume which is used by the Thin Provisioning function, the clone volume determination field 2633 and the primary volume determination field 2634 store '0'. If the logical volume is a clone volume, the primary volume LUN field 2635 stores information on the volume number of the primary volume corresponding to the clone volume.

Figure 13:
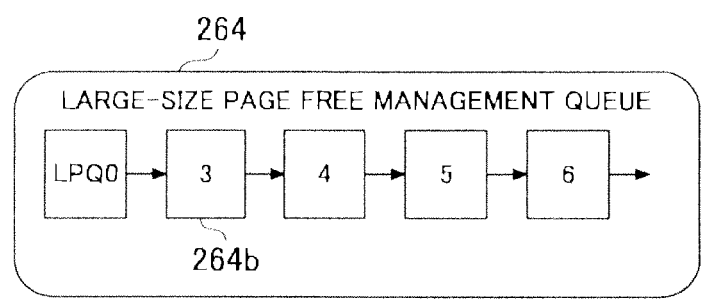
FIG. 13 is a conceptual view illustrating a large-size page free management queue according to this embodiment.

The large-size page free management queues 264 will be described next. One set of large-size page free management queues 264 is prepared for one shared pool 201. The large-size page free management queues 264 manage unused pages which do not store data among the large-size pages which are management units of the shared pool 201. As shown in FIG. 13, the large-size page free management queue 264 is a list of unused pages among the large-size pages and, when a large-size page is provided from the shared pool 201 to the snapshot function or Thin Provisioning function, the first queue 264b of the large-size page free management queue 264 is provided.

Figure 14:
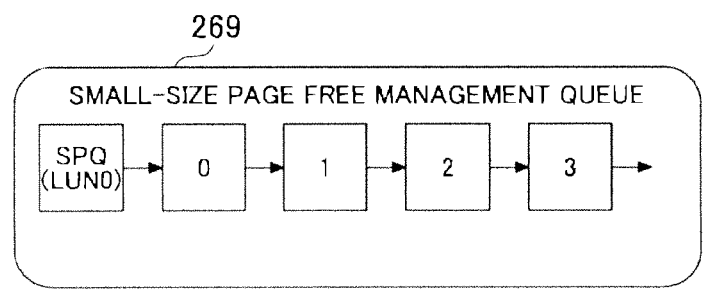
FIG. 14 is a conceptual view illustrating a small-size page free management queue according to this embodiment.

The small-size page free management queues 269 will be described next. One set of the small-size page free management queues 269 is prepared for one pointer ID of the page division management information 265. That is, one set of queues is created for a single clone volume. As shown in FIG. 14, the small-size page free management queue 269 is a list of unused pages among the small-size pages; one set of small-size page free management queues 269 is created for the pointer ID '0' shown in FIG. 6, for example.

More specifically, the small-size pages corresponding to the small-size page IDs for which '0' is stored in the page attribute field 2651 of the page division management table 265A are entered in the small-size page free management queue 269. Hence, if all '0's are stored in the page attribute field 2651 and '0' is stored in the attribute counter table 265B, all the small-size pages belonging to the pointer ID '0' in the page division management information 265 are entered in the small-size page free management queue 269. This indicates that the whole plurality of small-size pages obtained by dividing a single large-size page are unused pages. Accordingly, if all the small-size pages are unused pages, the small-size page free management queue 269 is deleted. The small-size page free management queue 269 is therefore created or deleted dynamically depending on the unused state of the small-size pages.

Note that, if a clone volume is deleted, the large-size page free management queues 264 for the large-size pages assigned to the clone volume are used as is by the snapshot function and the small-size page free management queue 269 is added to an undeleted clone-volume small-size page free management queue.

Figure 15:
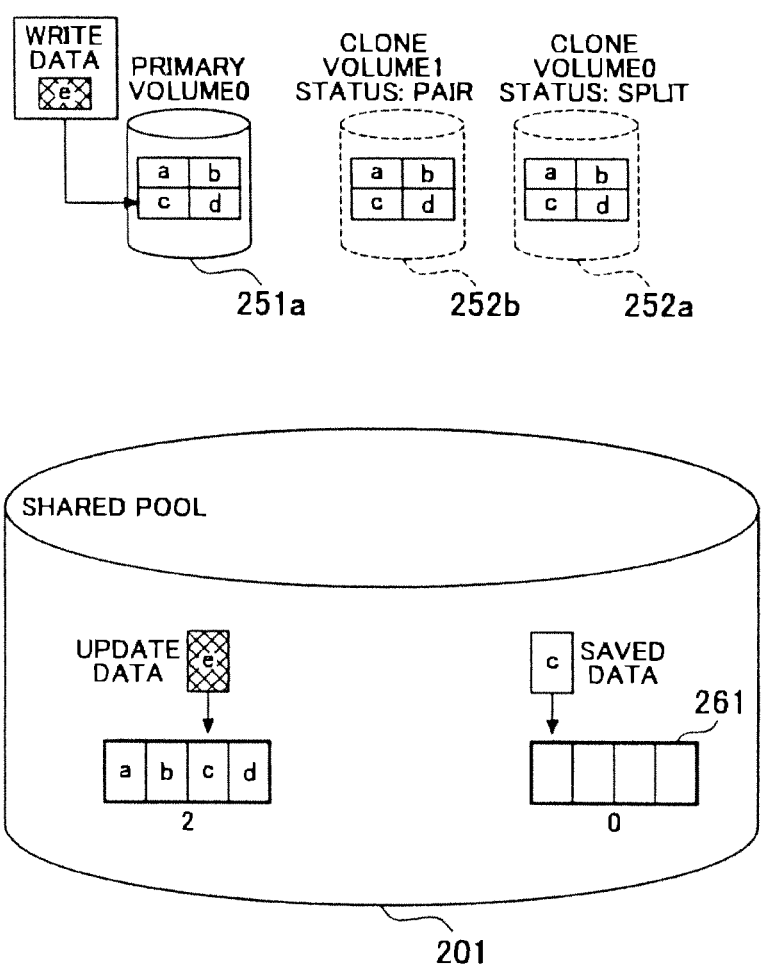
FIG. 15 is a conceptual view illustrating a data storage method using a snapshot function according to this embodiment.

A data storage method for a case where data write processing is generated in the primary volume will be described next. As shown in FIG. 15, the first clone volume 252a (hereinafter described as clone volume '0') is a backup of a primary volume 251a (hereinafter described as primary volume '0') and the status is 'Split', in which an image is fixed in a copied state. Furthermore, a second clone volume 252b (hereinafter described as clone volume '1') has the status 'Pair' and is in a state of synchronization with the primary volume '0'. In addition, the data of the primary volume '0' is stored in a first large-size page (hereinafter explained as a large-size page '2') of the shared pool 201.

For example, suppose that data of small-size page ID 'e' is written to the data of small-size page ID 'c' of the primary volume '0'. When the data of small-size page ID 'c' of the primary volume '0' is overwritten with the data of small-size page ID 'e', the data of clone volume '0' which shares the data of small-size page ID 'c' is also rewritten. Hence, in order to save the data of the small-size page ID 'c', a second large-size page 261 (hereinafter described as the 'large-size page '0'') is newly assigned to the clone volume '0' and the data of the small-size page ID 'c' is stored as saved data in the large-size page '0'. The data of the small-size page ID 'c' of the primary volume '0' stored in the large-size page '2' is subsequently overwritten. As a result, new data can be written to the primary volume '0' while preserving the data of the clone volume '0' generated as backup data.

A data storage method for a case where processing to write data to the primary volume '0' is also generated after the data writing shown in FIG. 15 will be described next. In FIG. 16, the clone volume '0' and clone volume '1' are in a state where a backup of primary volume '0' is made in different time zones and the status of both these volumes is 'Split', which fixes an image in a copied state. The clone volume '1' and primary volume '0' are also in a state of storing the same data.

For example, suppose that the data of small-size page ID 'f' is written to the data of small-size page ID 'a' in the primary volume '0'. When the data of the small-size page ID 'a' of primary volume '0' is overwritten with the data of small-size page ID 'f', both the data of the clone volume '0' and clone volume '1' sharing the data of small-size page ID 'a' are rewritten. Hence, in order to preserve the data of small-size page ID 'a', data 'a' is stored in the large-size page assigned to the clone volume with the slowest deletion time among the shared clone volumes. For example, in FIG. 16, clone volume '1' has a slower deletion time than clone volume '0'. In this case, 'a' is stored in the large-size page assigned to clone volume '1'. However, if a large-size page is not assigned to the clone volume '1', a third large-size page 264 (hereinafter described as large-size page '1') is newly assigned to clone volume '1'. Subsequently, the overwriting is performed with the data of small-size page ID 'a' of primary volume '0' which is stored in the large-size page '2'. As a result, the data of small-size page ID 'a' which is shared by clone volume '0' and clone volume '1' is stored in the newly assigned large-size page '1'.

At this point, processing to delete clone volumes generated by the snapshot function will be described. Typically, in cases where the snapshot function is used, clone volume deletion takes place starting with the clone volume with the oldest generation time. However, the archiving period may vary depending on the clone volume. For example, among the clone volumes shown in FIG. 16, clone volume '0', generated first, is deleted. When clone volume '0' is deleted, the data saved to the small-size page is unnecessary and therefore deleted. Suppose that, here, the data of small-size page ID 'a' which has been saved to the small-size page is stored in the large-size page '0', to which data of small-size page ID 'c' is saved. In this case, the data of small-size page ID 'c' can be deleted but the data of small-size page ID 'a' which is shared with the clone volume '1' cannot be deleted. Consequently, the small-size page '0' cannot be released and data fragmentation occurs within the shared pool 201. Accordingly, a large-size page is assigned to each of the clone volumes which are the units of deletion and, as a result of the shared pages shared between clone volumes being stored in large-size pages of the shared clone volume which is deleted last among the shared clone volumes, fragmentation within the shared pool 201 can be prevented when a clone volume is deleted.

A data storage method for a case where data write processing arises in the clone volume will be described next. As per FIGS. 15 and 16, a large-size page is assigned to each of the deletion-unit clone volumes. Data that has been written to the large-size page assigned to each of the clone volumes is stored in cases where data write processing arises in each clone volume.

Suppose that, as shown in FIG. 17, a large-size page '0' is assigned to clone volume '0', a large-size page '1' is assigned to clone volume '1', and a large-size page '2' is assigned to clone volume '2'. When data write processing is generated in each clone volume, the written data is stored in each of the assigned large-size pages. Only data related to clone volume '0' is stored in the large-size page '0' assigned to the clone volume '0', for example. Accordingly, the data shared with the clone volumes other than clone volume '0' is not stored in the large-size page '0', and therefore if clone volume '0' is deleted, the large-size page '0' associated with the clone volume '0' can also be deleted.

(1-4) Details on the Storage Apparatus Operation

Details on the operation of the storage apparatus 20 will be described next. The volume management processing which is executed by the storage control program 26 of the storage apparatus 20 will be described hereinbelow. Although the subject of the various processing described hereinbelow is programs or parts which form programs, it goes without saying that, in reality, the MPU 22 executes processing on the basis of these programs.

Figure 18:
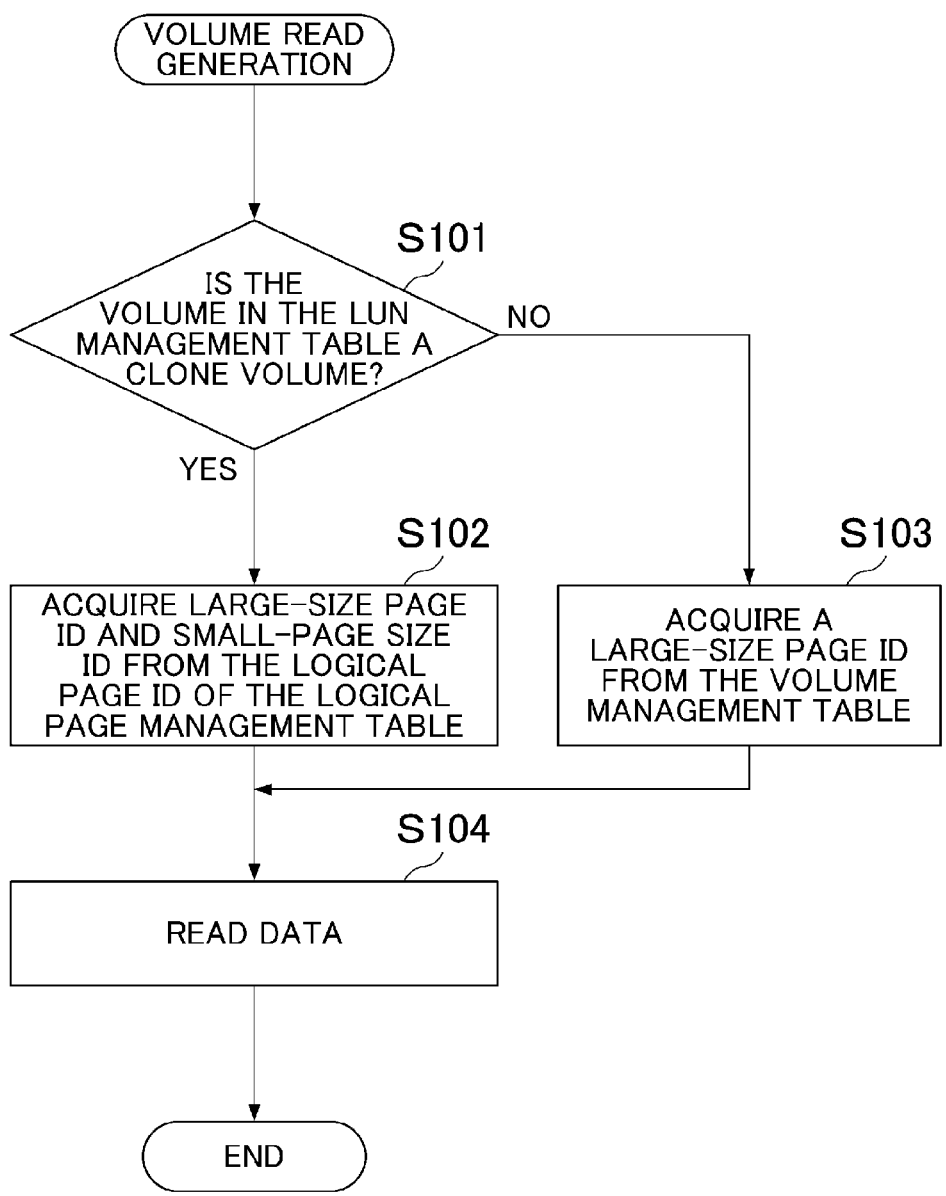
FIG. 18 is a flowchart showing a processing routine for volume read processing according to this embodiment.

First, a processing routine for processing in a case where a volume undergoes read processing by the host apparatus 10 will be described. As shown in FIG. 18, the storage control program 26 first refers to the LUN management table 263 to determine whether or not a volume which is a read processing target is a clone volume (S101). More specifically, the storage control program 26 refers to the clone volume determination field 2633 of the LUN management table 263 to determine whether or not the volume is a clone volume based on the value stored in the clone volume determination field 2633 which corresponds to the volume (HLUN) which is a read processing target. In other words, it is determined that the volume is a clone volume if '1' is stored in the clone volume determination field 2633 and that the volume is not a clone volume if '0' is stored in the clone volume determination field 2633.

If, in step S101, the read processing target volume is determined to be a clone volume, the storage control program 26 refers to the logical page management table 266 to acquire a small-size page ID and large-size page ID which correspond to the logical page ID which is the read processing target (S102). However, if the read processing target volume is determined not to be a clone volume in step S101, the storage control program 26 refers to the Thin Provisioning-volume volume management table 270 to acquire the large-size page ID corresponding to the host page No which is the read processing target (S103). Furthermore, the storage control program 26 reads the data stored in the page acquired in step S102 or step S103 (S104) and subsequently terminates the volume read processing.

Figure 19:
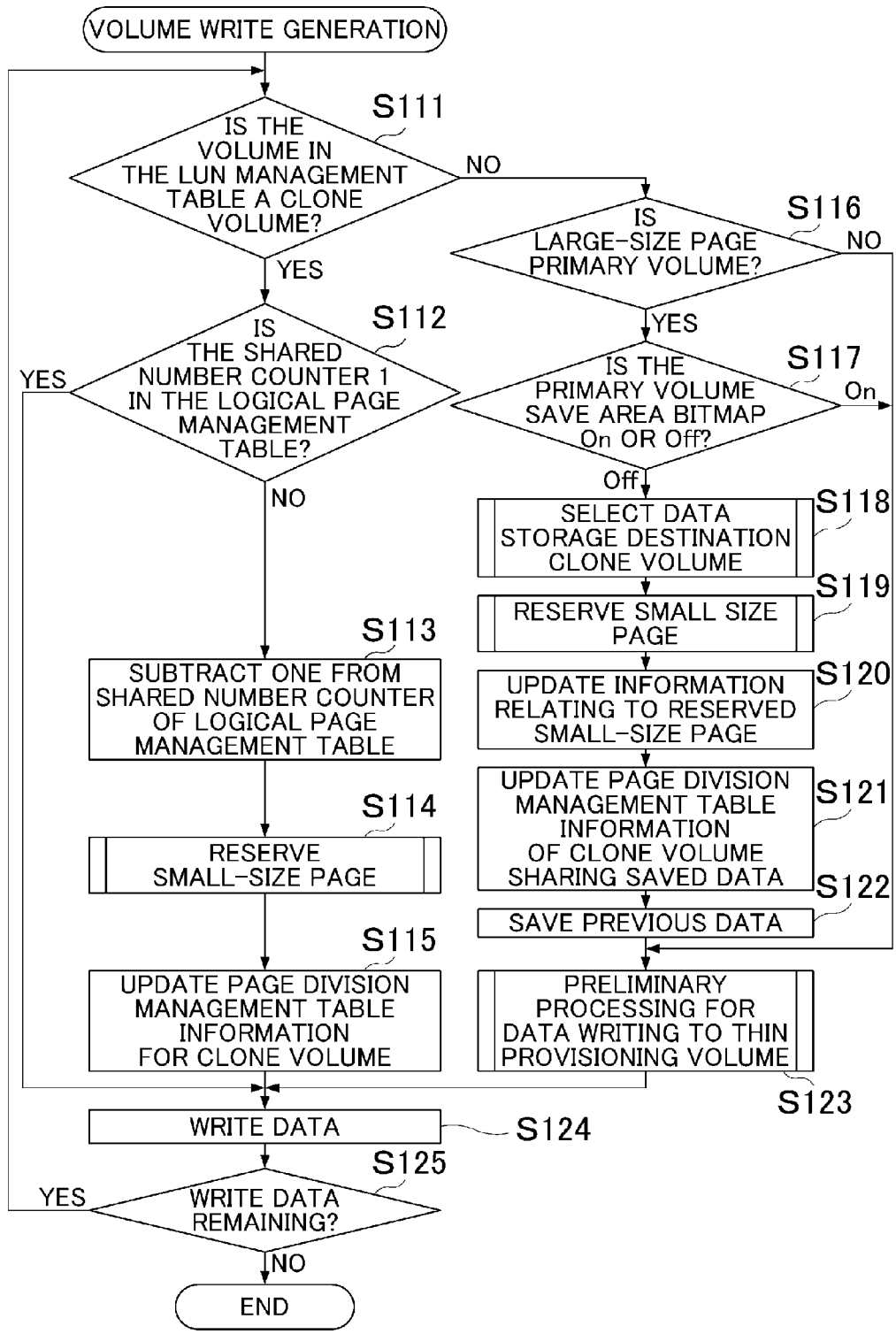
FIG. 19 is a flowchart showing a processing routine for volume write processing according to this embodiment.

A processing routine for processing in a case where a volume undergoes write processing by the host apparatus 10 will be described next. As shown in FIG. 19, the storage control program 26 first refers to the LUN management table 263 and determines whether or not the volume which is the read processing target is a clone volume (S111).

If, in step S111, the write processing target volume is determined to be a clone volume, the storage control program 26 refers to the logical page management table 266 to determine whether or not the shared number counter corresponding to the logical page ID which is the write processing target is '1' (S112).

If, in step S112, it is determined that the shared number counter is '1', the storage control program 26 executes the processing of step S124. If, on the other hand, it is determined in step S112 that the shared number counter is not '1' the storage control program 26 subtracts '1' from the shared number counter of the logical page management table 266 (S113). The storage control program 26 then reserves a small-size page (S114). More specifically, the storage control program 26 assigns unused pages, among the small-size pages contained in the large-size pages which are assigned to the relevant clone volume, as data storage area. The small-size page assignment processing in step S114 will be described subsequently in detail.

The storage control program 26 then updates the page division management information 265 of the relevant clone volume (S115). More specifically, the storage control program 26 stores '1' in the page attribute field 2651 which corresponds to the small-size page assigned in step S114 and stores the corresponding logical page ID in the logical page ID field 2652. The storage control program 26 then adds '1' to the value of the attribute counter field 2653.

If, on the other hand, it is determined in step S111 that the write processing target volume is determined not to be a clone volume, the storage control program 26 refers to the primary volume determination field 2634 of the LUN management table 263 to determine whether or not the large-size page which is the write processing target is a primary volume (S116). Furthermore, the storage control program 26 refers to a save area bitmap 2681 which is contained in the primary volume management information 268 of the primary volume in the LUN management table to determine whether or not the write-destination small-size page bit is 'On' or 'Off' (S117). Here, if the small-size page bit is 'On', this indicates that the data has already been saved. If, on the other hand, the small-size page bit is 'Off', this represents a state where data has not been saved.

Furthermore, if it is determined in step S117 that the bitmap is On and the data has already been saved, the storage control program 26 executes the processing of step S123. If, however, it is determined in step S117 that the bitmap is 'Off' and data has not been saved, the storage control program 26 selects the data storage destination clone volume where data is saved (S118). Processing to select the data storage destination clone volume in step S118 will be described in detail subsequently.

The storage control program 26 subsequently reserves a small-size page in the clone volume selected in step S118 (S119). More specifically, the storage control program 26 assigns the small-size page contained in the large-size page associated with the selected clone volume. The small-size page assignment processing in step S119 will be described in detail subsequently.

The storage control program 26 subsequently updates information relating to small-size pages reserved in step S119 (S120). More specifically, the storage control program 26 updates the small-size page ID corresponding to the logical page ID of the logical page management table 266 and the shared number counter and the large-size page ID to which the small-size page ID belongs. Furthermore, the storage control program 26 updates the page division management information 265 of the clone volume sharing the saved data (S121). The storage control program 26 then saves the former data in the small-size page reserved in step S119 (S122).

The storage control program 26 subsequently executes preliminary processing for data writing to the Thin Provisioning volume which is the data write processing target (S123). The data write preliminary processing in step S123 will be described in detail subsequently.

The storage control program 26 subsequently executes the data write processing (S124). Furthermore, the storage control program 26 executes the data write processing in step S124 and subsequently confirms whether or not write data remains in the volume (S125).

If it is determined in step S125 that write data remains, the storage control program 26 repeats the processing of step S111 and subsequent steps. If, however, it is determined in step S125 that no write data remains, the storage control program 26 determines the volume write processing.

Figure 20:
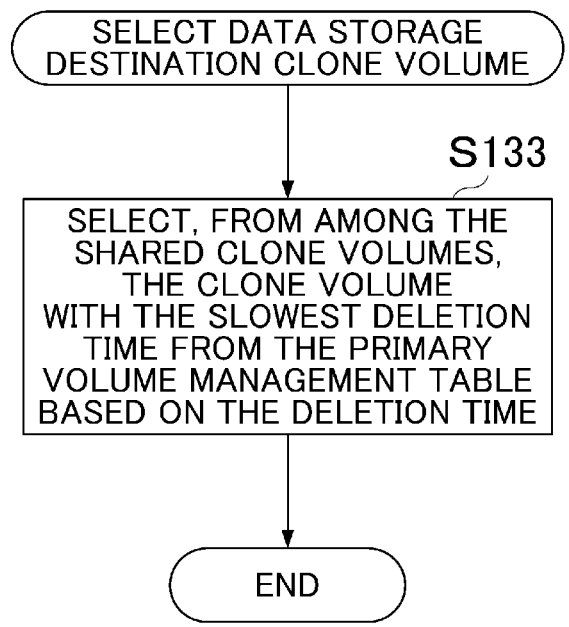
FIG. 20 is a flowchart showing a processing routine for data storage destination volume selection processing according to this embodiment.

A processing routine for processing to select a data storage destination clone volume of step S118 shown in FIG. 19 will be described next. As shown in FIG. 20, the storage control program 26 refers to the deletion time 2684 of the primary volume management table 2682 and selects the clone volume with the slowest deletion time among the shared archive target clone volumes (S133) and subsequently terminates the processing to select the data storage destination clone volume.

Figure 21:
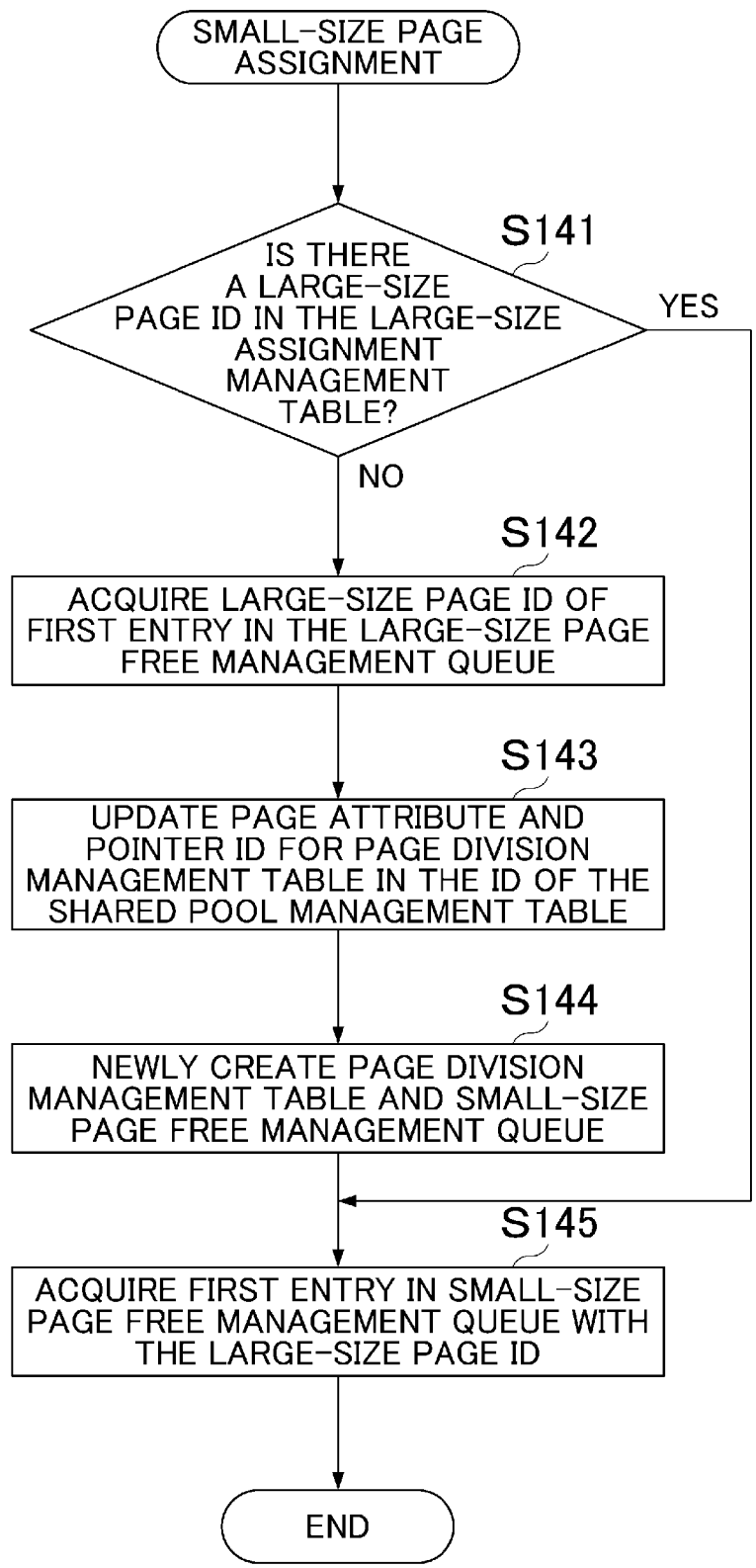
FIG. 21 is a flowchart showing a processing routine for small-size page assignment processing according to this embodiment.

The small-size page assignment processing in steps S114 and S119 shown in FIG. 19 will be described next. As shown in FIG. 21, the storage control program 26 first refers to the large-size page assignment management table 262 to determine whether or not the large-size page ID is stored in the large-size page ID field 2621 corresponding to the LUN of the clone volume selected in step S118 in FIG. 19 (S141).

If, in step S141, it is determined that there is a large-size page ID, the storage control program 26 executes the processing of step S145. If, however, it is determined in step S141 that there is no large-size page ID, the storage control program 26 acquires the large-size page ID of the first entry in the large-size page free management queue (S142). Furthermore, the storage control program 26 updates the page attribute which corresponds to the large-size page ID in the shared pool management table 261 and the pointer ID for the page division management information 265 (S143).

The storage control program 26 then newly creates page division management information 265 which corresponds to the pointer ID configured in step S143 and small-size page free management queue 269 (S144). The storage control program 26 then acquires the first entry in the small-size page free management queue with the large-size page ID (S145).

Figure 22:
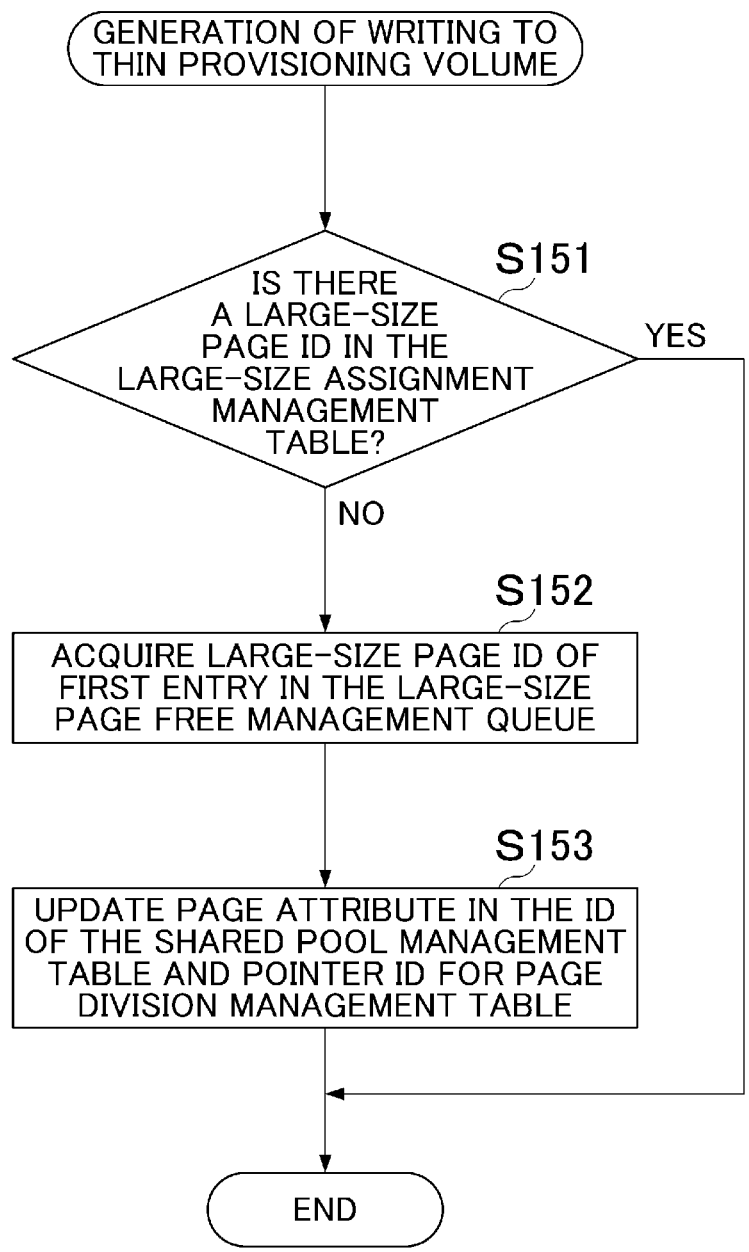
FIG. 22 is a flowchart showing a processing routine for Thin Provisioning-volume write processing according to this embodiment.

The preliminary processing for data writing to the Thin Provisioning volume which is the data write processing target in step S123 in FIG. 19 will be explained next. As shown in FIG. 22, the storage control program 26 refers to the large-size page assignment management table 262 to determine whether or not a large-size page ID is stored in the large-size page ID field which corresponds to the LUN of the clone volume selected in step S118 of FIG. 19 (S151).

If, in step S151, it is determined that there is a large-size page ID, the storage control program 26 terminates the processing. If, on the other hand, it is determined in step S151 that there is no large-size page ID, the storage control program 26 acquires the large-size page ID of the first entry in the large-size page free management queue (S152). The storage control program 26 then updates the page attribute corresponding to the large-size page ID in the shared pool management table 261 and the pointer ID in the page division management information 265 (S153) and subsequently terminates the preliminary processing for the data writing to the Thin Provisioning volume.

Figure 23:
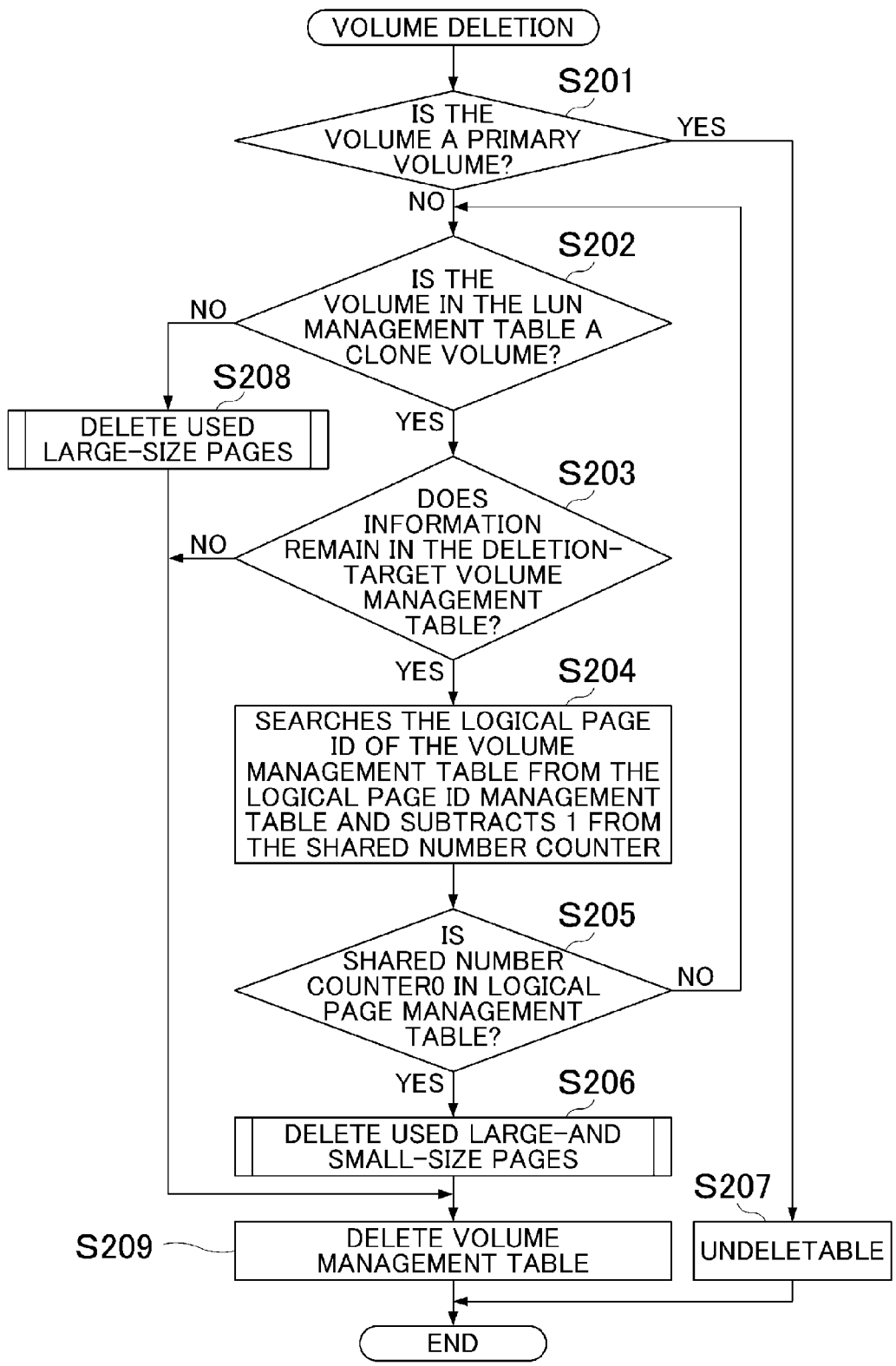
FIG. 23 is a flowchart showing a processing routine for volume deletion processing according to this embodiment.

The volume deletion processing will be described next. As shown in FIG. 23, the storage control program 26 first refers to the LUN management table 263 to determine whether the volume designated as the deletion target (the logical volume number stored in the HLUN field 2631) is a primary volume (S201).

If, in step S201, it is determined that the volume designated as the deletion target is a primary volume, the storage control program 26 refers to the LUN management table 263 to determine whether or not the volume is a clone volume (S202). If, on the other hand, it is determined in step S201 that the volume designated as a deletion target is a primary volume, the storage control program 26 is incapable of performing deletion (S207) and terminates processing. If, in step S207, the volume is a primary volume, it may be determined whether or not the volume is undeletable or if the volume can be deleted according to a policy of the snapshot function.

Furthermore, if it is determined in step S202 that the volume is a clone volume, the storage control program 26 determines whether or not any information is stored in the volume management table 267 of the deletion-target clone volume (S203). If, on the other hand, it is determined in step S202 that the volume is not a clone volume, the storage control program 26 executes processing to delete the used large-size page (S208). The processing to delete the used large-size page in step S208 will be described in detail subsequently.

Furthermore, if it is determined in step S203 that some kind of information is stored in the volume management table 267 of the deletion-target clone volume, the storage control program 26 searches the logical page management table 266 for the logical page ID stored in the logical page ID field 2671 of the volume management table 267 and subtracts '1' from the shared number counter corresponding to the logical page ID (S204). The storage control program 26 then determines, as a result of subtracting '1' from the shared number counter in step S204, that the shared number counter is '0' (S205). If, on the other hand, it is determined in step S203 that there is no information of any kind stored in the volume management table 267 of the deletion-target clone volume, the storage control program 26 executes the processing of step S209.

Further, if it is determined in step S205 that the shared number counter '0', the storage control program 26 executes processing to delete used large-size pages and small-size pages (S206). The processing to delete the used large-size pages and small-size pages in step S206 will be described in detail subsequently. The storage control program 26 subsequently deletes the volume management table of the volume designated as the deletion target (S209) and terminates the volume deletion processing. More specifically, if the volume designated as the deletion target is a clone volume, the storage control program 26 deletes the clone-volume volume management table 267 and, if the volume designated as a deletion target is a Thin Provisioning volume, the storage control program 26 deletes the Thin-Provisioning volume management table 270.

Figure 24:
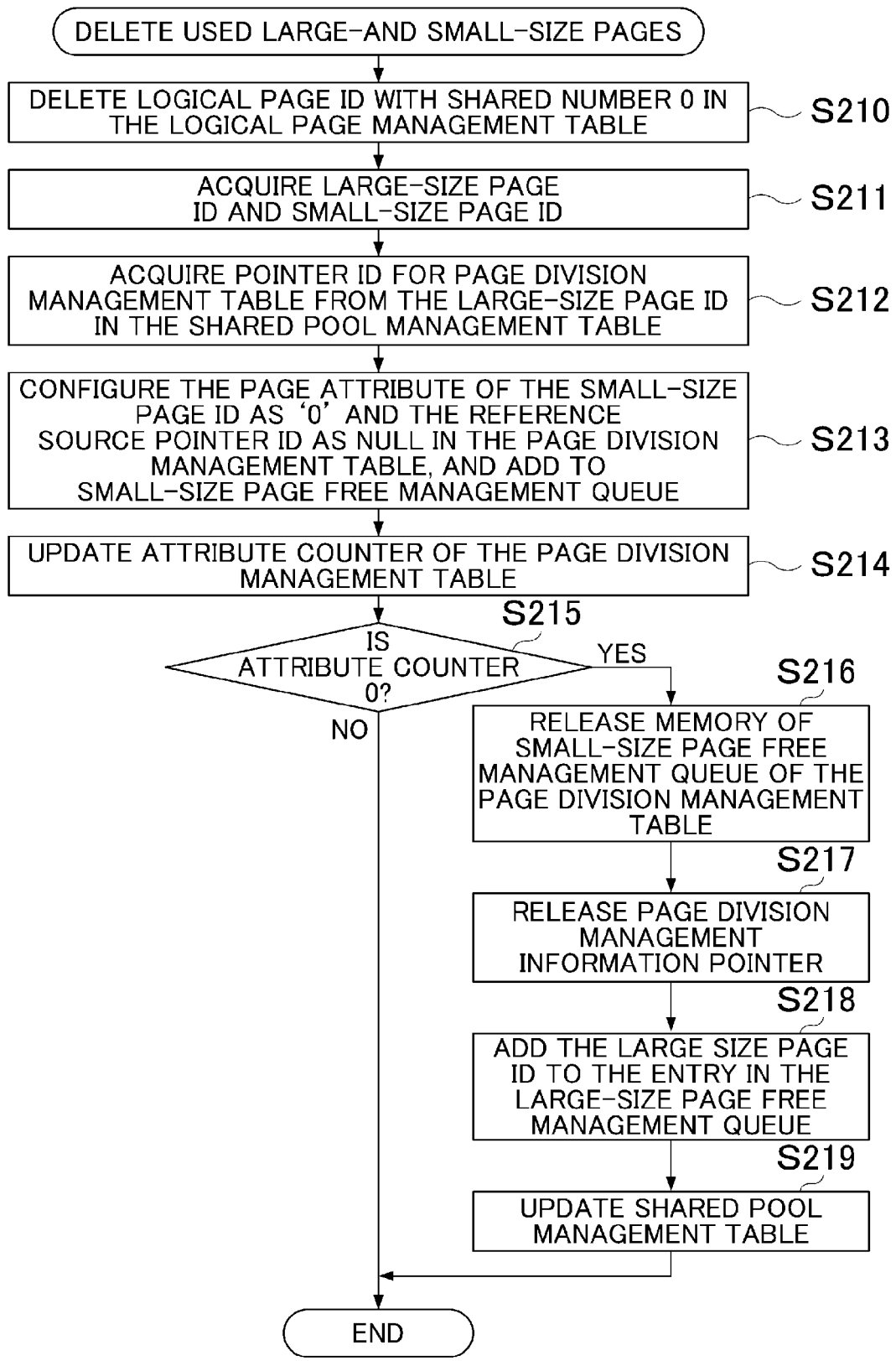
FIG. 24 is a flowchart showing a processing routine for used page deletion processing according to this embodiment.

Processing to delete used large and small size pages in step S206 of FIG. 23 will be described next. As shown in FIG. 24, the storage control program 26 first deletes the logical page ID with the shared number '0' in the logical page management table 266 (S210). The storage control program 26 then acquires the large-size page ID and small-size page ID for which the logical page ID was deleted in step S210 (S211). The storage control program 26 then refers to the shared pool management table 261 and acquires the pointer ID for the page division management information 265 corresponding to the large-size page ID acquired in step S211 (S212).

The storage control program 26 then refers to the page division management table 265A contained in the page division management information 265 corresponding to the pointer ID acquired in step S212 and stores '0' in the page attribute field 2651 corresponding to the small-size page ID acquired in step S211, stores 'null' in the logical page ID field 2652, and adds the small-size page to the small-size page free management queue 269 (S213). Furthermore, the storage control program 26 updates the attribute counter of the attribute counter table 265B in the page division management information 265 (S214). More specifically, the storage control program 26 subtracts the number of pages of the small-size pages updated in the page division management table 265A in step S213, from the attribute counter.

The storage control program 26 subsequently determines whether the attribute counter stored in the attribute counter table 265B after the attribute counter is updated in step S214 is '0' (S215). If, in step S215, it is determined that the attribute counter is '0', the storage control program 26 releases memory of the small-size page free management queue 269 which corresponds to the page division management information 265 (S216). The storage control program 26 then releases the pointer in the page division management information 265 (S217). The storage control program 26 also adds the large-size page ID acquired in step S211 to the entry in the large-size page free management queue 264 (S218). The storage control program 26 then updates the shared pool management table 261 (S219) and terminates the used large- and small-size page deletion processing. More specifically, the storage control program 26 stores '0' in the page attribute field 2611 corresponding to the large-size page ID which is the deletion target in the shared pool management table 261 and stores 'null' in the pointer ID field 2612.

In addition, if it is determined in step S215 that the attribute counter is not '0', the storage control program 26 is unable to release the large-size page and terminates the used large- and small-size page deletion processing.

Figure 25:
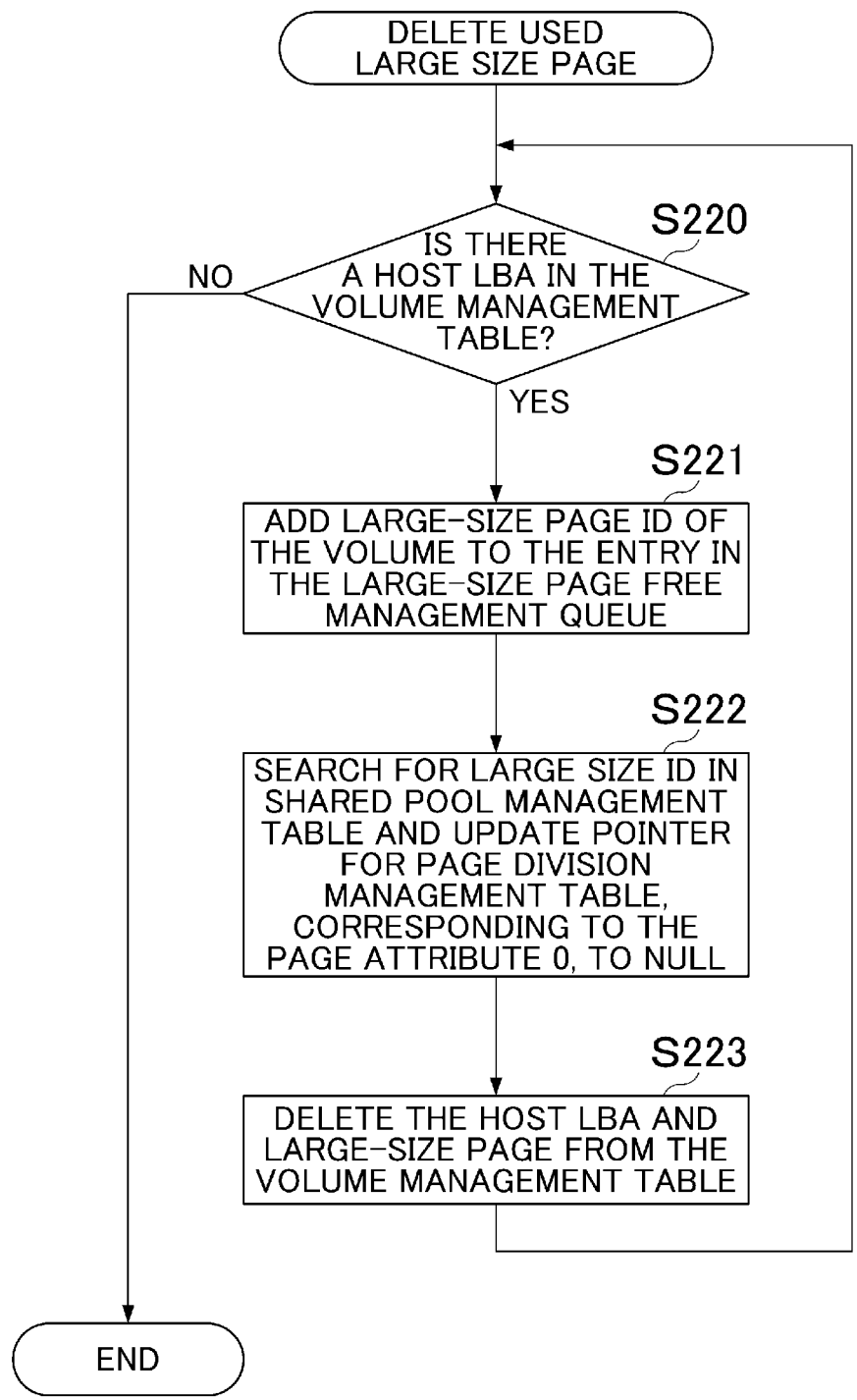
FIG. 25 is a flowchart showing a processing routine for used page deletion processing according to this embodiment.

Processing to delete Thin Provisioning-volume used large-size pages in step S208 of FIG. 23 will be described next. As shown in FIG. 25, the storage control program 26 first determines whether the host page number (Host LBA) pertaining to the Thin-Provisioning volume management table 270 is stored in the volume management table 267 in order to ascertain whether the management information for the deletion-target volume has been deleted (S220). If, in step S220, it is determined that the corresponding host page number is stored in the volume management table 267, the storage control program 26 adds the large-size page ID of this volume to the entry in the large-size page free management queue 264 (S221).

The storage control program 26 subsequently searches for the large-size page ID which is the deletion target in the shared pool management table 261 and stores '0' in the page attribute field 2611 corresponding to the large-size page ID, stores 'null' in the pointer ID field 2612, and updates the shared pool management table 261 (S222). The storage control program 26 subsequently deletes the host page number (Host LBA) of the volume which is the deletion target and the large-size page ID from the Thin Provisioning-volume volume management table 270 (S223).

The storage control program 26 then returns to step S220 and, if it is determined that the relevant host page number is not stored in the volume management table 267, terminates the used large-size page deletion processing.

(1-5) Effect of the Embodiment

As mentioned earlier, in the computer system 1 according to this embodiment, management is performed by dividing the shared pool 201 of the storage apparatus 20 into large-size pages which correspond to first pages of the present invention and dividing the large-size pages into small-size pages which correspond to second pages of the present invention, and Thin Provisioning volumes which correspond to first volumes of the present invention are managed using large-size pages, while clone volumes which correspond to second volumes of the present invention are managed using small-size pages. If data writing by the host apparatus 10 then takes place, a large-size page is assigned to the data storage area of the Thin Provisioning volume. Furthermore, if a volume copy is made by the snapshot function, a large-size page is assigned to the copy-destination volume and the differential data between the copy-source data and the copy-destination data is stored in a small-size page obtained by dividing the large-size page. Storage areas of different page sizes can accordingly be managed in a single pool, enabling unused capacity in the same pool to be used efficiently. Since a large-size page is assigned to each of the deletion-target volumes, it is possible to prevent fragmentation in the pool when volumes are deleted.

(2) Second Embodiment

A computer system 2 according to a second embodiment is configured similarly to the computer system 1 according to the first embodiment with regard to the hardware configuration of the computer system and the hardware configuration of each device thereof. The differences from the first embodiment in particular will be described in detail hereinbelow.

This embodiment differs from the first embodiment in that a plurality of volumes share a large-size page. In this embodiment, as shown in FIG. 26, a large-size page '1' to be shared by three clone volumes is assigned to clone volume '0', clone volume '1', and clone volume '2', for example. More specifically, if a shared large-size page is assigned to a plurality of clone volumes, the same large-size page ID is configured for a plurality of LUN in the large-size page assignment management table 262 shown in FIG. 11.

By assigning a large-size page which is shared by a plurality of clone volumes in this way, the capacity efficiency can be improved. Particularly if there are a plurality of volumes to be deleted simultaneously, the capacity efficiency can be improved while preventing data fragmentation in the shared pool 201.

(3) Third Embodiment

A computer system 3 according to a third embodiment is configured similarly to the computer system 1 according to the first embodiment with regard to the hardware configuration of the computer system and the hardware configuration of each device thereof. The differences from the first embodiment in particular will be described in detail hereinbelow.

Figure 27:
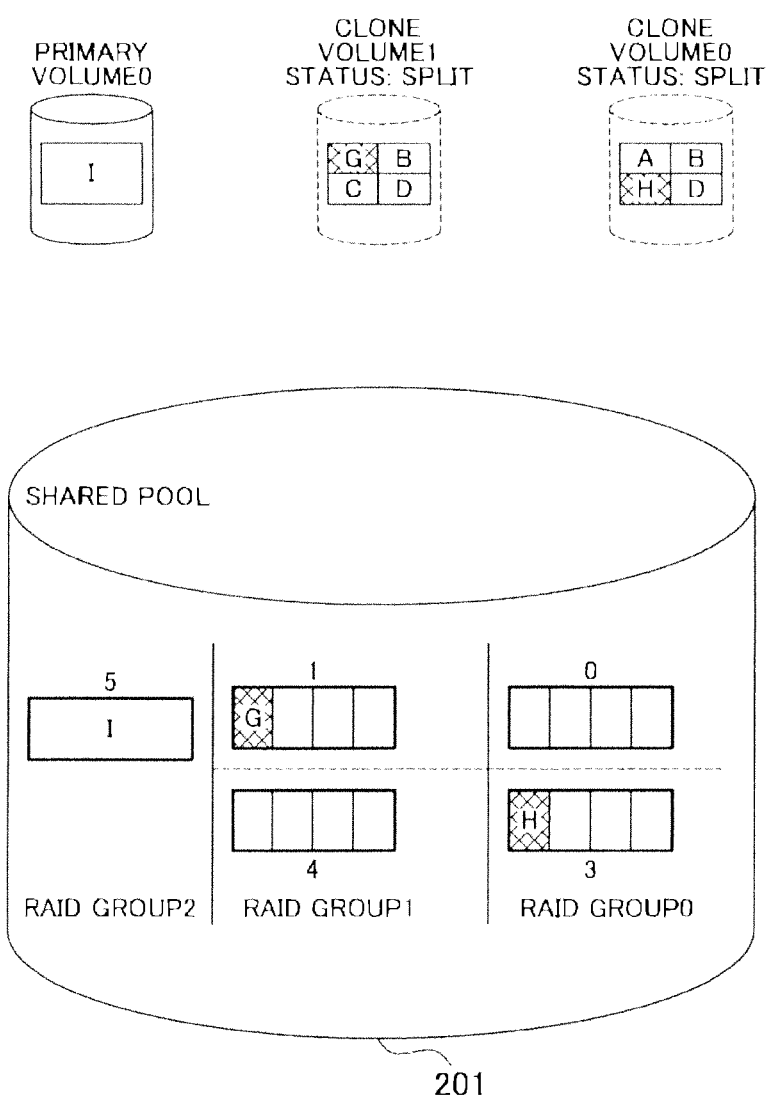
FIG. 27 is a conceptual view providing an overview of a third embodiment.

This embodiment differs from the first embodiment in that the large-size pages which are assigned to each volume are distributed between RAID groups. In this embodiment, as shown in FIG. 27, it is assumed that a RAID group '0' and RAID group '1' can be used as storage locations for differential data for a clone volume '0', for example. In this case, when new large-size pages are assigned to the clone volume '0', a large-size page with large-size page ID '3' and a large-size page with large-size page ID '4' are assigned simultaneously. More specifically, if a plurality of large-size pages are simultaneously assigned to a single clone volume, a plurality of large-size page IDs are configured for one LUN in the large-size page assignment management table 262 shown in FIG. 11. Furthermore, if a small-size page ID is selected, this page ID is selected alternately from a plurality of large-size page IDs.

By assigning a plurality of large-size pages to a single volume in this way, it is possible to avoid data of a single volume being stored in a concentrated fashion in a single RAID group. Volume management can thus be afforded improved performance.

(4) Fourth Embodiment

The computer system 4 according to the fourth embodiment is configured similarly to the computer system 1 according to the first embodiment with regard to the hardware configuration of the computer system and the hardware configuration of each device thereof. The differences from the first embodiment in particular will be described in detail hereinbelow.

Figure 28:
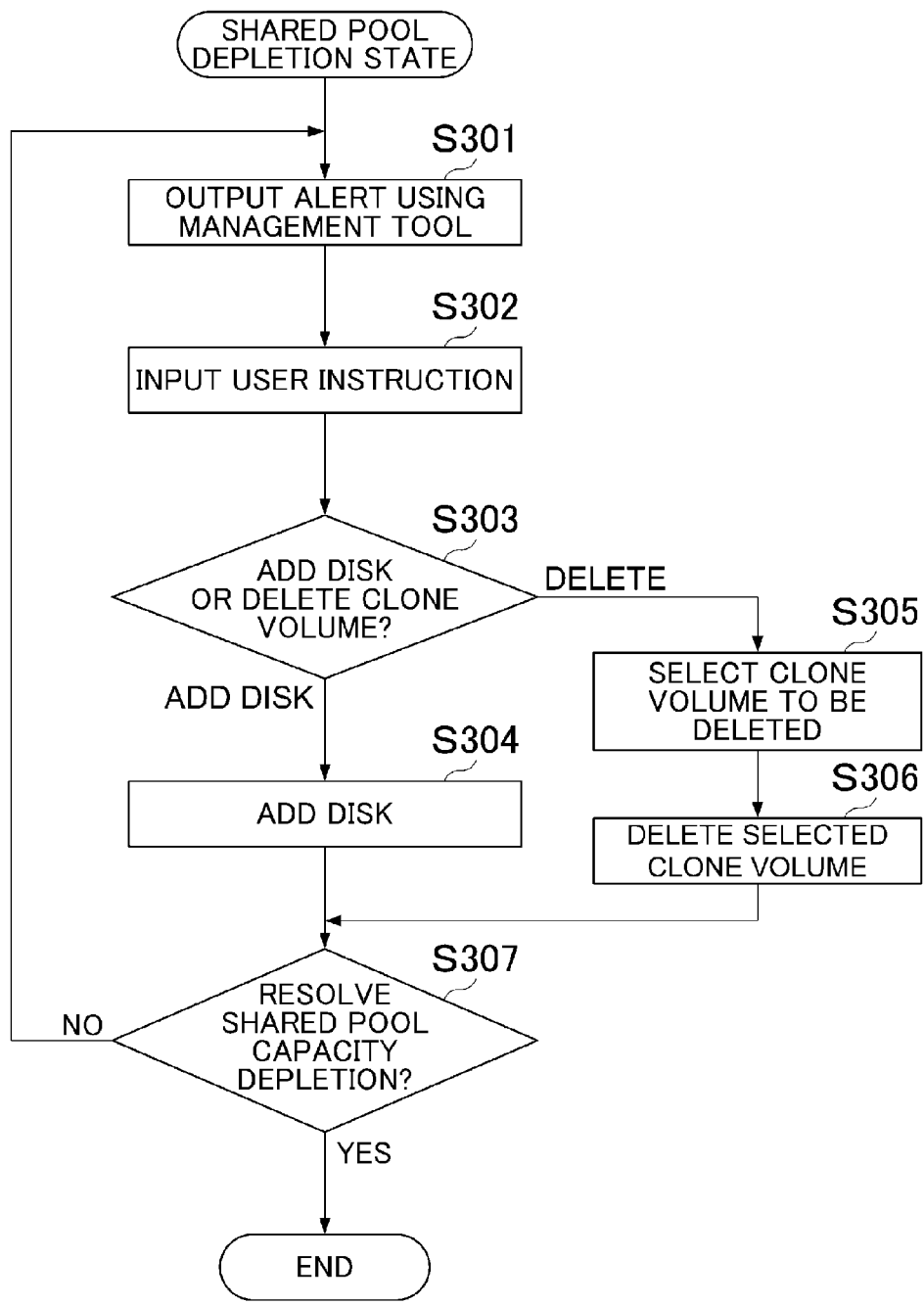
FIG. 28 is a flowchart showing a processing routine for processing for handling shared pool capacity depletion according to a fourth embodiment.

In this embodiment, the following processing is executed if the capacity of the shared pool 201 is depleted. As shown in FIG. 28, the storage control program 26 first outputs an alert using a storage management tool in order to inform the user that the capacity of the shared pool 201 is depleted (S301). The storage control program 26 then receives an input of a user instruction regarding the depletion of the capacity of the shared pool 201 (S302).

The storage control program 26 subsequently determines whether the user instruction thus input in step S302 is an instruction to add a disk or an instruction to delete a clone volume (S303). If it is determined in step S303 that the user instruction is an instruction to add a disk, a disk is added by a user operation and the like (S304). If, however, it is determined in step S303 that the user instruction is an instruction to delete a clone volume, the storage control program 26 selects a clone volume which is the deletion target according to the user input (S305). In step S305, the storage control program 26 may select the clone volume which is the deletion target on the basis of a predetermined policy. The storage control program 26 then deletes the clone volume selected in step S305 (S306).

Finally, the storage control program 26 determines whether the capacity depletion of the shared pool 201 has been resolved (S307). If, in step S307, it is determined that the capacity depletion of the shared pool 201 is not resolved, the storage control program 26 repeats the processing of step S301 and subsequent steps. However, if it is determined in step S307 that the capacity depletion of the shared pool 201 is resolved, the storage control program 26 terminates the processing.

If, as a result of executing the aforementioned processing for handling capacity depletion of the shared pool 201, the capacity of the shared pool 201 is depleted, processing suitable for when the capacity of the shared pool 201 is depleted can be performed by issuing some kind of warning to the user, adding a disk in response to a user instruction, and deleting a clone volume.

(5) Additional Embodiments

Although the MPU 22 of the storage apparatus 20 implements various functions of the present invention based on various programs which are stored in the storage apparatus 20 in the foregoing embodiments, the present invention is not limited to this example. For example, the MPU 22 may be provided in another apparatus separate from the storage apparatus 20 and various functions may be implemented in cooperation with the MPU. Furthermore, the various programs stored in the storage apparatus 20 may be provided in another apparatus separate from the storage apparatus 20 such that various functions are implemented as a result of these programs being called by the MPU 22.

In addition, each of the steps in the processing of the storage apparatus 20 or the like of this specification need not necessarily be chronologically processed according to the order represented as a flowchart. In other words, each of the steps in the processing of the storage apparatus 20 or the like may also be executed in parallel even in different processes.

Furthermore, a computer program, which causes hardware such as the CPU, ROM, and RAM contained in the storage apparatus 20 or the like to exhibit the same functions as each of the configurations of the foregoing storage apparatus 20 or the like, can also be created. Furthermore, a storage medium for storing the computer program is also provided.

INDUSTRIAL APPLICABILITY

The present invention can be applied to a storage apparatus which uses the Thin Provisioning function and the snapshot function.

REFERENCE SIGNS LIST

1 Computer system
10 Host apparatus

20 Storage apparatus
21 Storage controller
23 Memory
24 Configuration information
25 Cache area
26 Storage control program
27 Management terminal interface unit
28 Host interface unit
29 Drive interface unit
30 Management terminal
40 Network

The invention claimed is:

1. A storage apparatus which is connected via a network to a host apparatus which requests data writing, the storage apparatus comprising:
at least one storage unit which stores data that is read/written by the host apparatus; and
a control unit which controls writing of the data to the storage unit,
wherein the control unit is configured to:
provide at least one pool from the storage unit and divide one of the at least one pool into a plurality of first pages having an area of a first size,
provide a plurality of volumes including a first volume and a second volume to the host apparatus,
in response to a first write request to the first volume, allocate a first one of the first pages to the data storage area of the first volume and store data of the first write request to the allocated first one of the first pages in a unit of a first page size, and
in response to a second write request to the first volume, allocate a second one of the first pages to the second volume and further allocate at least one second page, which is obtained by dividing the second one of the first pages allocated to the second volume, to the data storage area of the second volume and store data stored in the storage area indicated by the second write request to the allocated second page in a unit of a second page size.

2. The storage apparatus according to claim 1,
wherein the at least one storage unit is configured to store:
a first volume management table which performs management by associating information indicating the first one of the first pages in the pool with information indicating the data storage area of the first volume to which the first one of the first pages is allocated, and
a second volume management table which performs management by associating information indicating the second page with information indicating the data storage area of the second volume to which the second page is allocated and information indicating the second one of the first pages to which the second page belongs.

3. The storage apparatus according to claim 1,
wherein the first volume is a virtual volume for a use of a Thin Provisioning function, and
wherein the second volume is a copy volume of the first volume generated by using a snapshot function,
wherein the differential data between the first volume and the second volume is stored in the pool with the second page unit.

4. The storage apparatus according to claim 3,
wherein the control unit is configured to:
generate a plurality of the second volumes which is the copy volume of the first volume and manage the number of the second volumes referring to each of the second page in the pool.

5. The storage apparatus according to claim 4,
wherein the control unit is configured to:
delete at least one of the second volumes with releasing the second page allocated to the at least one of the second volumes to be deleted, in case that the second page is not referred by the other one of the second volumes.

6. The storage apparatus according to claim 5,
wherein the control unit is configured to release the second one of the first pages allocated to the at least one of the second volumes to be deleted in case that all the second pages belongs to the second one of the first pages are released.

7. The storage apparatus according to claim 1,
wherein the control unit is configured to
generate a plurality of the second volumes which is the copy volume of the first volume, and
allocate third one of the first pages to the plurality of the second volumes.

8. The storage apparatus according to claim 1,
wherein the at least one storage unit configures a plurality of RAID (Redundant Array of Inexpensive Disks) groups,
wherein the control unit is configured to allocate a plurality of the first pages belonging to different RAID groups to the data storage area of the second volume.

9. The storage apparatus according to the claim 1,
wherein the first one of the first pages allocated to the first volume is not managed in the unit of the second page size.

10. A storage apparatus which is connected via a network to a host apparatus which requests data writing, the storage apparatus comprising:
at least one storage unit which stores data that is read/written by the host apparatus; and
a control unit which controls writing of the data to the storage unit,
wherein the control unit is configured to:
provide at least one pool from the storage unit and divide one of the at least one pool into a plurality of first pages having an area of a first size,
provide a plurality of volumes including a first volume and a second volume to the host apparatus,
in response to a first write request to the first volume, allocate a first one of the first pages to the data storage area of the first volume and store data of the first write request to the allocated first one of the first pages in a unit of a first page size, and
in response to a second write request to the first volume, allocate a second one of the first pages to the second volume and further allocate at least one second page, which is obtained by dividing the second one of the first pages allocated to the second volume, to the data storage area of the second volume and store data stored in the storage area indicated by the second write request to the allocated second page in a unit of a second page size,
wherein the at least one storage unit is configured to store:
a first volume management table which performs management by associating information indicating the first one of the first pages in the pool with information indicating the data storage area of the first volume to which the first one of first pages is allocated, and
a second volume management table which performs management by associating information indicating the second page with information indicating the data storage area of the second volume to which the second page is allocated and information indicating the second one of the first pages to which the second page belongs, wherein the first volume is a virtual volume for a use of a Thin Provisioning function, wherein the second volume is a copy volume of the first volume generated by using a snapshot function, wherein the differential data between the first volume and the second volume is stored in the pool with the second page unit, wherein the control unit is configured to generate a plurality of the second volumes which is the copy volume of the first volume and manage the number of the second volumes referring to each of the second page in the pool, wherein the control unit is configured to delete at least one of the second volumes with releasing the second page allocated to the at least one of the second volumes to be deleted, in case that the second page is not referred by the other one of the second volumes, wherein the control unit is configured to release the second one of the first pages allocated to the at least one of the second volumes to be deleted in case that all the second pages belongs to the second one of the first pages are released, wherein the control unit is configured to generate a plurality of the second volumes which is the copy volume of the first volume, and allocate third one of the first pages to the plurality of the second volumes, wherein the at least one storage unit configures a plurality of RAID (Redundant Array of Inexpensive Disks) groups, and wherein the control unit is configured to allocate a plurality of the first pages belonging to different RAID groups to the data storage area of the second volume.

11. A volume management method using a storage apparatus which is connected via a network to a host apparatus which requests data writing, the storage apparatus comprising at least one storage unit which stores data that is read/written by the host apparatus and a control unit which controls writing of the data to the storage unit, and the control unit is configured to provide at least one pool from the storage unit, divide one of the at least one pool into a plurality of first pages having an area of a first size, provide a plurality of volumes including a first volume and a second volume to the host apparatus, the volume management method comprising:
in response to a first write request to the first volume, allocating a first one of the first pages to the data storage area of the first volume and storing data of the first write request to the allocated first one of the first pages in a unit of a first page size, and in response to a second write request to the first volume, allocating a second one of the first pages to the second volume and further allocating at least one second page, which is obtained by dividing the second one of the first pages allocated to the second volume, to the data storage area of the second volume and storing data stored in the storage area indicated by the second write request to the allocated second page in a unit of a second page size.

12. The volume management method according to claim 11, wherein the at least one storage unit stores
a first volume management table which performs management by associating information indicating the first one of the first pages in the pool with information indicating the data storage area of the first volume to which the first one of the first pages is allocated, and
a second volume management table which performs management by associating information indicating the second page with information indicating the data storage area of the second volume to which the second page is allocated and information indicating the second one of the first pages to which the second pages belong.

13. The volume management method according to claim 11,
wherein the first volume is a virtual volume for a use of a Thin Provisioning function,
wherein the second volume is a copy volume of the first volume generated by using a snapshot function,
wherein the differential data between the first volume and the second volume is stored in the pool with the second page unit.

14. The volume management method according to claim 13,
wherein the control unit generates a plurality of the second volumes which is the copy volume of the first volume and manages the number of the second volumes referring to each of the second pages in the pool.

15. The volume management method according to claim 14,
wherein the control unit deletes at least one of the second volumes with releasing the second page allocated to the at least one of the second volumes to be deleted, in case that the second page is not referred by the other one of the second volumes.

16. The volume management method according to claim 15,
wherein the control unit releases the second one of the first pages allocated to the at least one of the second volumes to be deleted in case that all the second pages belongs to the second one of the first pages are released.

17. The volume management method according to claim 11,
wherein the control unit generates a plurality of the second volumes which is the copy volume of the first volume, and allocates third one of the first pages to the plurality of the second volumes.

18. The volume management method according to claim 11,
wherein the at least one storage unit configures a plurality of RAID (Redundant Array of Inexpensive Disks) groups, and
wherein the control unit allocates a plurality of the first pages belonging to different RAID groups to the data storage area of the second volume.

* * * * *